United States Patent [19]
Suga et al.

[11] Patent Number: 5,985,490
[45] Date of Patent: Nov. 16, 1999

[54] HOLOGRAM AND METHOD OF AND APPARATUS FOR PRODUCING THE SAME

[75] Inventors: Kazuhiro Suga; Atsushi Sekiguchi; Kenji Ueda; Hiroyuki Nishimura, all of Tokyo, Japan

[73] Assignee: Dai Nippon Printing Co., Ltd., Tokyo, Japan

[21] Appl. No.: 08/838,502

[22] Filed: Apr. 7, 1997

Related U.S. Application Data

[62] Division of application No. 08/370,179, Jan. 9, 1995, Pat. No. 5,660,954, which is a division of application No. 08/039,854, Mar. 30, 1993, Pat. No. 5,453,338.

[30] Foreign Application Priority Data

| Mar. 31, 1992 | [JP] | Japan | 4-76653 |
| Mar. 31, 1992 | [JP] | Japan | 4-76659 |
| Oct. 30, 1992 | [JP] | Japan | 4-293141 |
| Oct. 30, 1992 | [JP] | Japan | 4-293142 |
| Oct. 30, 1992 | [JP] | Japan | 4-293143 |
| Dec. 8, 1992 | [JP] | Japan | 4-327918 |

[51] Int. Cl.$^6$ .................................................. G03H 1/04
[52] U.S. Cl. ........................ 430/2; 430/1; 430/290; 359/1; 359/12
[58] Field of Search .................. 430/1, 2, 290; 359/12, 1, 3

[56] References Cited

U.S. PATENT DOCUMENTS

T861,026  4/1969  Harper et al. ............................. 359/1

(List continued on next page.)

FOREIGN PATENT DOCUMENTS 55-38536  3/1980  Japan ..................................... 359/12

(List continued on next page.)

OTHER PUBLICATIONS

Nakajima et al. "Copied Phase Hologram of Photoresist", Fujitsu Sci. Tech. J., vol. 6, No. 3, Sep. 1970.

*Primary Examiner*—Martin Angebranndt

[57] ABSTRACT

A duplicating photosensitive material film is brought into close contact with an ND glass reduced in thickness so as to become flexible or a flexible sheet or an ND glass coated with a cushioning layer through an optical contacting liquid containing a surface active agent. In addition, a spacer is interposed between a hologram original plate and a duplicating photosensitive material, and a space defined by the spacer is filled with an optical contacting liquid, thereby regulating the thickness of the optical contacting liquid layer with the spacer. Therefore, when pressure is applied, the optical contacting liquid is uniformly pressed, so that it can be made uniform and thin in thickness. Accordingly, it is possible to prevent a failure of duplication of a hologram image due to undesirable flow of the optical contacting liquid. In addition, the wettability of the optical contacting liquid improves, so that it is possible to prevent trapping of air and foaming and to make the optical contacting liquid uniform and thin in thickness. Thus, it becomes possible to duplicate a hologram image excellently. In addition, a cushioning layer is provided on the inner side of an AR coated ND glass or on the upper side of a photosensitive material film, and another cushioning layer is provided on the side of an original plate protecting glass which is closer to the optical contacting liquid or on the lower side of the photosensitive material film. With this arrangement, even if dust enters, it can be effectively held inside the cushioning layers. Thus, it is possible to prevent undesirable flow of the optical contacting liquid and lifting of the film due to dust and hence possible to perform duplication effectively without any hindrance. Also disclosed is a hologram producing apparatus which includes mechanisms for feeding and taking up a duplicating photosensitive material film, and a contacting liquid dropping mechanism. The apparatus further includes a mechanism for nipping an excess of contacting liquid dropped, a mechanism for drying the contacting liquid attached to the exposed duplicating photosensitive material film, a mechanism for positioning the film, etc.

13 Claims, 8 Drawing Sheets

U.S. PATENT DOCUMENTS

| | | | |
|---|---|---|---|
| 3,647,289 | 3/1972 | Weber | 359/12 |
| 3,658,526 | 4/1972 | Haugh | 430/1 |
| 4,335,173 | 6/1982 | Caraballo | 346/135.1 |
| 4,367,911 | 1/1983 | Graube | 430/1 |
| 4,530,564 | 7/1985 | Close | 359/12 |
| 4,735,890 | 4/1988 | Nakane | 430/5 |
| 4,790,612 | 12/1988 | Dickson | 359/12 |
| 4,950,567 | 8/1990 | Keys et al. | 430/1 |
| 4,984,856 | 1/1991 | Moss et al. | 359/12 |
| 5,260,149 | 11/1993 | Monroe et al. | 359/3 |
| 5,282,066 | 1/1994 | Yu et al. | 430/1 |
| 5,453,338 | 9/1995 | Suga et al. | 430/1 |
| 5,504,593 | 4/1996 | Hotta et al. | 359/12 |
| 5,633,100 | 5/1997 | Mickish et al. | 430/1 |

FOREIGN PATENT DOCUMENTS

| | | | |
|---|---|---|---|
| 55-69142 | 8/1980 | Japan . | |
| 58-37679 | 3/1983 | Japan . | |
| 63-75781 | 4/1988 | Japan . | 430/1 |
| 1-231082 | 9/1989 | Japan . | |
| 2-113287 | 4/1990 | Japan . | |
| 2-140787 | 5/1990 | Japan . | |
| 2119111 | 11/1983 | United Kingdom | 359/12 |

21 ··· Film
22 ··· Supply roller
23 ··· Take-up roller
24 ··· Support
25 ··· Contacting liquid dropping device
26 ··· Original plate
27 ··· Roller
28 ··· Contacting liquid dropping device
29 ··· ND layer
30 ··· Laser beam
31 ··· Drying chamber

IMAGE CONTAINING RECORD
OF FOREIGN SUBSTANCE ITSELF

IMAGE CONTAINING RECORD OF DISTORTION
OF FILM PRESSED BY FOREIGN SUBSTANCE

1 ··· AR coated ND glass
2 ··· Optical contacting liquid
3 ··· Original plate supporting glass
4 ··· Original plate film
5 ··· Optical adhesive
6 ··· Original plate protecting glass
7 ··· Optical contacting liquid
8 ··· Duplicating photosensitive material film
9 ··· Optical contacting liquid
10 ··· AR coated ND glass

- 58 Non-reflecting substrate
- 57 ND filter
- 56 Original plate
- 55 Substrate
- 53 Spacer
- 52 Photosensitive material
- 51 Substrate
- 54 IMF

HOLOGRAM AND METHOD OF AND APPARATUS FOR PRODUCING THE SAME

This application is a divisional of U.S. patent application Ser. No. 08/370,179, filed Jan. 9, 1995 now U.S. Pat. No. 5,660,954, which is a divisional of U.S. patent application Ser. No. 08/039,854, filed Mar. 30, 1993, now U.S. Pat. No. 5,453,338.

BACKGROUND OF THE INVENTION

The present invention relates to a hologram and a method of and apparatus for producing the same. Here, it should be noted that the term "produce" as used in the present invention includes "duplicate".

More specifically, the present invention relates to a hologram produced by applying laser light split into two beams to a recording unit including a photosensitive material film placed in close contact with an anti-reflection coated glass or an ND glass or an anti-reflection coated ND glass through an optical contacting liquid, and also relates to a method of producing the hologram.

A hologram original plate has heretofore been duplicated by applying a laser beam to the hologram original plate placed in close contact with a photosensitive material so that diffracted light from the original plate and the incident light interfere with each other in the photosensitive material, thereby recording a hologram image of the original plate in the photosensitive material. In this process, in order to prevent the disorder of the image due to the back reflection component, an optical contacting liquid that is substantially equal to the original plate in refractive index is interposed between the original plate and the photosensitive material, thereby enhancing the adhesion and preventing back reflection during the duplication of the hologram image.

Incidentally, the optical contacting liquid, which is interposed between the glass and the photosensitive material film, is difficult to apply with a uniform thickness because of fluidity, vibration, etc. In particular, when a large amount of contacting liquid is applied, it is likely to take a long time from the application of the liquid to the settlement of its flow, which interferes with the production of a hologram. In addition, even if production or duplication of a hologram is carried out in a clean room, it is impossible to completely eliminate foreign substances (dust) of the order of 10 μm in diameter which are carried in from the outside when the operator enters the room, or when the materials are fed in, and attached to the film and/or the glass. Such foreign substances undesirably lift the film, resulting in regions where the hologram cannot be recorded due to the flow of the optical contacting liquid around the foreign substances. In addition, since the film is pressed by the foreign substances, the hologram produced or made by duplication is attended with a large number of defects (depression-shaped defects) with which a reconstructed image of the hologram looks as if there were depressions of the order of several hundred μm to several mm in diameter.

SUMMARY OF THE INVENTION

It is an object of the present invention to provide a hologram in which the optical contacting liquid is made uniform and thin in thickness and which can be duplicated without any hindrance even if a foreign substance is mixed in.

It is another object of the present invention to provide a method of and apparatus for producing a hologram, whereby the optical contacting liquid is made uniform and thin in thickness and a hologram can be produced without any hindrance even if a foreign substance is mixed in.

It is still another object of the present invention to make it possible to prevent mingling of air during production of a hologram.

It is a further object of the present invention to allow an optical contacting liquid to become uniform in thickness within a short time and to enable a hologram to be produced excellently and efficiently.

To these ends, the present invention provides a hologram produced by applying laser light split into two beams to a recording unit including a photosensitive material film placed in close contact with an anti-reflection coated glass or an ND (Neutral Density) glass or an anti-reflection coated ND glass through an optical contacting liquid. In this arrangement, a cushioning layer made principally of a polymer of high elasticity is provided either on the side of the anti-reflection coated glass or ND glass or anti-reflection coated ND glass which is closer to the film or on the side of the film which is closer to the glass so that a mingling foreign substance is buried in the cushioning layer, thereby reducing the incidence of depression-shaped defects.

In addition, the present invention provides a duplicate hologram which is recorded on a duplicating photosensitive material film by applying laser light to a duplicating system in which an original plate unit, which includes an original plate hologram supported by a substrate and an original plate protecting glass bonded to the upper side of the original plate hologram, is brought into close contact with a duplicating unit which includes the duplicating photosensitive material film placed in close contact through an optical contacting liquid with an anti-reflection coated glass or an ND glass or an anti-reflection coated ND glass or an ND glass placed in close contact with an anti-reflection coated glass through an optical contacting liquid. In this arrangement, a cushioning layer made principally of a polymer of high elasticity is provided either on the side of the original plate protecting glass which is closer to the duplicating unit or on the side of the duplicating photosensitive material film which is closer to the original plate unit so that a foreign substance which may mingle during duplication is buried in the cushioning layer, thereby reducing the incidence of depression-shaped defects.

In addition, the present invention provides a method of producing a hologram by applying laser light split into two beams to a recording unit including a photosensitive material film placed in close contact with an anti-reflection coated glass or an ND glass or an anti-reflection coated ND glass through an optical contacting liquid. In this method, a cushioning layer made principally of a polymer of high elasticity is provided either on the side of the anti-reflection coated glass or ND glass or anti-reflection coated ND glass which is closer to the film or on the side of the film which is closer to the glass so that a foreign substance which may mingle during the production of the hologram is buried in the cushioning layer, thereby reducing the incidence of depression-shaped defects.

An addition, the present invention provides a hologram producing method in which an image of an original plate hologram is recorded on a duplicating photosensitive material film by applying laser light to a duplicating system in which an original plate unit, which includes the original plate hologram supported by a substrate and an original plate protecting glass bonded to the upper side of the original plate hologram, is brought into close contact with a duplicating unit which includes the duplicating photosensitive material film placed in close contact through an optical contacting liquid with an anti-reflection coated glass or an ND glass or an anti-reflection coated ND glass or an ND glass placed in close contact with an anti-reflection coated glass through an optical contacting liquid. In this method, a cushioning layer made principally of a polymer of high elasticity is provided either on the side of the original plate protecting glass which is closer to the duplicating unit or on the side of the duplicating photosensitive material film which is closer to the original plate unit so that a foreign substance which may mingle during duplication is buried in the cushioning layer, thereby reducing the incidence of depression-shaped defects.

In addition, the present invention provides a hologram producing apparatus including a device for supplying a duplicating film, a device for dropping or coating a contacting liquid on a hologram original plate supported by a support and on the duplicating film, and a roller for smoothing the supplied contacting liquid. The apparatus further includes a device for pressing a flexible layer against the film through the contacting liquid, a laser light source for applying laser light from above the flexible layer, and a device for drying the exposed duplicating film.

In addition, the present invention provides a hologram producing method in which an image of an original plate hologram is recorded on a duplicating photosensitive material film by applying laser light to a duplicating system in which an original plate unit, which includes the original plate hologram supported by a substrate and an original plate protecting glass bonded to the upper side of the original plate hologram, is brought into close contact with a duplicating unit which includes the duplicating photosensitive material film placed in close contact with an anti-reflection coated glass or an ND glass or an anti-reflection coated ND glass through an optical contacting liquid. In this method, a surface active agent is added to the optical contacting liquid so as to increase wettability of the optical contacting liquid with respect to the base material, thereby reducing the incidence of depression-shaped defects caused by air trapped during duplication.

In addition, the present invention provides a hologram producing method in which an image of an original plate hologram is recorded on a duplicating photosensitive material film by applying laser light to a duplicating system in which an original plate unit, which includes the original plate hologram supported by a substrate and an original plate protecting glass bonded to the upper side of the original plate hologram, is brought into close contact with a duplicating unit which includes the duplicating photosensitive material film placed in close contact with an anti-reflection coated glass or an ND glass or an anti-reflection coated ND glass through an optical contacting liquid. In this method, the optical contacting liquid has a viscosity in the range of 100 cps to 10,000 cps so that a foreign substance which may mingle during duplication is buried in the viscous optical contacting liquid, thereby reducing the incidence of depression-shaped defects caused by foreign substances.

In addition, the present invention provides a hologram producing method in which an image of an original plate hologram is recorded on a duplicating photosensitive material film by applying laser light to a duplicating system in which an original plate unit, which includes the original plate hologram supported by a substrate and an original plate protecting glass bonded to the upper side of the original plate hologram, is brought into close contact with a duplicating unit which includes the duplicating photosensitive material film placed in close contact with an anti-reflection coated glass or an ND glass or an anti-reflection coated ND glass through an optical contacting liquid. In this method, the optical contacting liquid is a liquid substance comprising an ionizing radiation curing polymer, monomer or the like so that the optical contacting liquid is polymerized through a curing reaction caused by irradiation with ionizing radiation during or after the duplication process, thereby making it separable from the film.

In addition, the present invention provides a hologram producing method wherein a hologram original plate and a duplicating photosensitive material are brought into close contact with each other through at least a rigid spacer and an optical contacting liquid injected into a space defined by the spacer, and laser exposure is carried out so that diffracted light from the hologram original plate and incident light interfere with each other in the duplicating photosensitive material, thereby recording a hologram image in the duplicating photosensitive material.

In addition, the present invention provides a hologram producing method wherein a hologram original plate and a duplicating photosensitive material are brought into close contact with each other directly or with a transparent member interposed therebetween, and an anti-reflection coated glass or an ND glass or an anti-reflection coated ND glass is placed on either the hologram original plate or the duplicating photosensitive material in close contact with each other through a rigid spacer and an optical contacting liquid injected into a space defined by the spacer. Then, laser light for exposure is applied from the glass side so that diffracted light from the hologram original plate and incident light interfere with each other in the duplicating photosensitive material, thereby recording a hologram image in the duplicating photosensitive material.

In addition, the present invention provides a hologram producing method wherein a hologram original plate and a duplicating photosensitive material are brought into close contact with each other through at least a spacer and an optical contacting liquid injected into a space defined by the spacer, and an anti-reflection coated glass or an ND glass or an anti-reflection coated ND glass is placed on either the hologram original plate or the duplicating photosensitive material in close contact with each other through a spacer and an optical contacting liquid injected into a space defined by the spacer. Then, laser light for exposure is applied from the glass side so that diffracted light from the hologram original plate and incident light interfere with each other in the duplicating photosensitive material, thereby recording a hologram image in the duplicating photosensitive material.

In addition, the present invention provides a hologram producing method in which an image of an original plate hologram is recorded on a duplicating photosensitive material film by applying laser light to a duplicating system in which an original plate unit, which includes the original plate hologram supported by a substrate, is brought into close contact with a duplicating unit which includes the duplicating photosensitive material film placed in close contact with an anti-reflection coated glass or an ND glass or an anti-reflection coated ND glass through an optical contacting liquid. In this method, the thickness of the anti-reflection coated glass or ND glass or anti-reflection coated ND glass is set in the range of 0.1 mm to 1.5 mm so that the glass is flexible.

In addition, the present invention provides a hologram producing method in which an image of an original plate hologram is recorded on a duplicating photosensitive material film by applying laser light to a duplicating system in which an original plate unit, which includes the original plate hologram supported by a substrate, is brought into close contact with a duplicating unit which includes the duplicating photosensitive material film placed in close contact with a polymeric material sheet through an optical contacting liquid. In this method, the sheet is flexible and equal to the optical contacting liquid in refractive index.

In addition, the present invention provides a hologram producing method in which an image of an original plate hologram is recorded on a duplicating photosensitive material film by applying laser light to a duplicating system in which an original plate unit, which includes the original plate hologram supported by a substrate, is brought into close contact with a duplicating unit which includes the duplicating photosensitive material film placed in close contact with an anti-reflection coated glass or an ND glass or an anti-reflection coated ND glass through an optical contacting liquid. In this method, a cushioning layer is provided on the side of the anti-reflection coated glass or ND glass or anti-reflection coated ND glass which is closer to the optical contacting liquid.

In addition, the present invention provides a hologram producing method in which an image of an original plate hologram is recorded on a duplicating photosensitive material film by applying laser light to a duplicating system in which an original plate unit, which includes the original plate hologram supported by a substrate and an original plate protecting glass bonded to the upper side of the original plate hologram, is brought into close contact with a duplicating unit which includes the duplicating photosensitive material film placed in close contact with an anti-reflection coated glass or an ND glass or an anti-reflection coated ND glass through an optical contacting liquid. In this method, a cushioning layer is provided either on the side of the anti-reflection coated glass or ND glass or anti-reflection coated ND glass which is closer to the optical contacting liquid or on the upper side of the photosensitive material film, and another cushioning layer is provided either on the side of the original plate protecting glass which is closer to the duplicating unit or on the lower side of the photosensitive material film.

DESCRIPTION OF THE PREFERRED EMBODIMENTS

Figure 1:
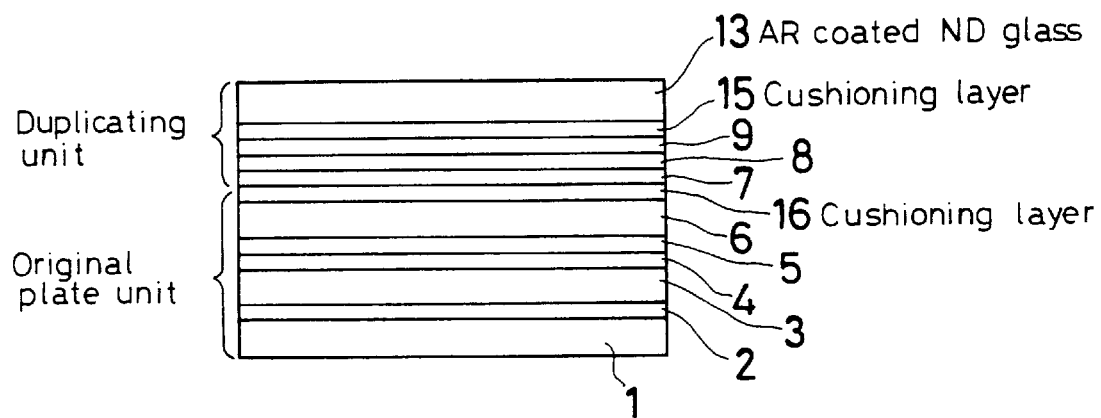
FIG. 1 is a view for explanation of one example of a method of duplicating a hologram according to the present invention, in which a cushioning layer is provided.

FIG. 1 illustrates a hologram duplicating method according to the present invention, which employs a flexible ND glass provided with an anti-reflection (AR) coating. On the AR coated ND glass 1, an original plate supporting glass 3 is placed in close contact with it through an optical contacting liquid 2. An original plate film 4 is supported by the supporting glass 3, and an original plate protecting glass 6 is bonded to the original plate film 4 with an optical adhesive 5, thereby forming an original plate unit. On the original plate unit, a duplicating photosensitive material film 8 is placed with a cushioning layer 16 and an optical contacting liquid 7 interposed therebetween, and an optical contacting liquid 9, a cushioning layer 15, and an AR coated ND glass 13 are successively stacked up on the film 8, thereby forming a duplicating unit.

Thus, according to the present invention, the adhesive cushioning layer 15 is provided on the inner side of the AR coated ND glass 13, and the cushioning layer 16 is provided on the side of the original plate protecting glass 6 which is closer to the optical contacting liquid 7. The cushioning layers 15 and 16 are formed by employing gelatin used for photography, casein used in the process for producing semiconductors, an adhesive polymeric material, etc. By virtue of the presence of these cushioning layers 15 and 16, force acts uniformly on the optical contacting liquid, so that the optical contacting liquid can be made uniform and thin in thickness. In addition, if dust is mixed in, it is held inside the cushioning layer 15 or 16. Thus, it is possible to prevent undesirable flow of the contacting liquid and lifting of the film by foreign substances. Accordingly, duplication of the hologram can be effected without any hindrance. It should be noted that the same advantageous effects can also be obtained by an arrangement in which the cushioning layer 15 is replaced by a similar cushioning layer provided on the upper side of the photosensitive material film 8, and the cushioning layer 16 is replaced by a similar cushioning layer provided on the lower side of the photosensitive material film 8.

As the cushioning layers, various kinds of material can be used as follows:

The cushioning layers may be polymer layers formed of a binder polymer, or a binder polymer containing a plasticizer.

Examples of binder polymers usable in the present invention include natural polymers and synthetic polymers.

Examples of preferable natural polymers are proteins such as albumin, globulin, casein, collagen, gelatin, elastin, keratin, fibroin, etc., polysaccharides such as agar (agarose and agaropectin), alginic acid, chitin, chitosan, cellulose, starch, lignin, etc., and natural rubber.

Among these natural polymers, casein, gelatin, and natural rubber, which are excellent in optical properties and coating properties, are particularly preferable.

Examples of preferable synthetic polymers are acrylate-styrene-acrylonitrile (AAS) copolymer, acrylonitrilebutadiene-styrene (ABS) copolymer, chlorinated polyethylene-acrylonitrile-styrene (ACS) copolymer, acrylic ester copolymer, olefin-vinyl alcohol copolymer, alkyd resin, amino resin, bismaleimide-triazine resin, cellulose acetate (CA), cellulose acetate butyrate (CAB), ethyl cellulose (EC), hydroxyethyl cellulose, carboxymethyl cellulose, chlorinated polyether, cumarone resin, chlorinated polyethylene, allyl resin, ethylene-α-olefin copolymer, ethylene-vinyl acetate copolymer (EVA), ethylene-vinyl chloride copolymer, ethylene-vinyl acetate-vinyl chloride copolymer, epoxy resin, furan resin, fluorocarbon resin, ionomer, ketone resin, methacrylate-butadiene-styrene (MBS) copolymer, methacryl-styrene copolymer, nitrile resin, hydroxybenzoyl polyester, petroleum resin, phenol resin, polyacetal, polyamide, polyamidimide, polyarylate, polyallyl sulfone, polybutadiene, thermosetting polybutadiene, polybutylene, polybutylene terephthalate, polycarbonate, polyether sulfone, polyethylene, water crosslinkable polyethylene, polyethylene terephthalate, polyimide, polyamino bismaleimide, methacrylic resin (PMMA), polymethylpentene, polypropylene, polyphenylene oxide, polyphenylene sulfide, polyphenylene sulfone, polysulfone, polystyrene, styrene-acrylonitrile (SAN) copolymer, styrene copolymer, butadiene-styrene copolymer, polyurethane, vinyl acetate resin, polyvinyl acetal, polyvinyl alcohol, polyvinyl chloride, acryl modified polyvinyl chloride, polyvinylidene chloride, silicone, xylene resin, urethane acrylate resin, etc.

Typical polymers usable in the present invention and the refractive indices and glass transition temperatures thereof will be shown below.

| Polymers | n | Tg (K°) |
| --- | --- | --- |
| Polyvinylidene fluoride | 1.42 | 233 |
| Polydimethyl silylene (polydimethyl siloxane) | 1.43 | 146 |
| Polyoxypropylene | 1.4495 | 198 |
| Polyvinyl isobutyl ether | 1.4507 | 254 |
| Polyvinyl ethyl ether | 1.4540 | 230 |
| Polyoxyethylene | 1.4563 | 232 |
| Polyvinyl butyl ether | 1.4563 | 218 |
| Polyvinyl pentyl ether | 1.4581 | 207 |
| Polyvinyl hexyl ether | 1.4591 | 199 |
| Poly(4-methyl-1-pentene) | 1.459–1.465 | 302 |
| Cellulose acetate butyrate | 1.46–1.49 | 322–388 |
| Polyvinyl octyl ether | 1.4613 | 194 |
| Poly(vinyl-2-ethyl hexyl ether) | 1.4626 | 207 |
| Polyvinyl decyl ether | 1.4628 | 211 |
| Poly(2-methoxy ethyl acrylate) | 1.463 | 223 |
| Polybutyl acrylate | 1.4631 | 251 |
| Poly(t-butyl methacrylate) | 1.4638 | 333 |
| Poly(3-ethoxy propyl acrylate) | 1.465 | 218 |
| Polyvinyl propionate | 1.4665 | 283 |
| Polyvinyl acetate | 1.4665 | 305 |
| Polyvinyl methyl ether | 1.467 | 242 |
| Polyethyl acrylate | 1.4685 | 249 |
| Ethylene-vinyl acetate copolymer (80%–20% vinyl acetate) | 1.47–1.50 | |
| Cellulose propionate | 1.47–1.49 | 400 |
| Cellulose triacetate | 1.47–1.48 | 322–751 |
| Polyvinyl methyl ether (isotactic) | 1.4700 | 242 |
| Poly(3-methoxypropyl acrylate) | 1.471 | 198 |
| Poly(2-ethoxyethyl acrylate) | 1.471 | 223 |
| Polymethyl acrylate | 1.472–1.480 | 283 |
| Polyisopropyl methacrylate | 1.4728 | 354 |
| Poly(1-decene) | 1.4730 | 232 |
| Polypropylene (atactic; density: 0.8575 g/cm³) | 1.4735 | 260 |
| Poly(vinyl sec-butyl ether) (isotactic) | 1.4740 | 254 |
| Polydodecyl methacrylate | 1.4740 | 208 |
| Polyoxyethylene oxysuccinoyl (polyethylene succinate) | 1.4744 | 244 |
| Polytetradecyl methacrylate | 1.4746 | 201–264 |

-continued

| Polymers | n | Tg (K°) |
| --- | --- | --- |
| Ethylene-propylene copolymer (EPR-rubber) | 1.4748–1.48 | 140–260 |
| Polyhexadecyl methacrylate | 1.4750 | 288 |
| Polyvinyl formate | 1.4757 | 310 |
| Polyisobutyl methacrylate | 1.477 | 333 |
| Ethyl cellulose | 1.479 | 316 |
| Polyvinyl acetal | 1.48–1.50 | 305 |
| Cellulose acetate | 1.48–1.50 | 322–751 |
| Cellulose tripropionate | 1.48–1.49 | 400 |
| Polyoxymethylene | 1.48 | 232 |
| Polyvinyl butyral | 1.48–1.49 | 322 |
| Poly(n-hexyl methacrylate) | 1.4813 | 268 |
| Poly(n-butyl methacrylate) | 1.483 | 293 |
| poly(n-propyl methacrylate) | 1.484 | 308 |
| Polyethyl methacrylate | 1.485 | 338 |
| Poly(1,1-diethylpropyl methacrylate) | 1.4889 | 268 |
| Polymethyl methacrylate | 1.4893 | 378 |
| Poly(2-decyl-1,3-butadiene) | 1.4899 | 220 |
| Polyvinyl alcohol | 1.49–1.53 | 358 |
| Polyethylene glycolate methacrylate | 1.4903 | 328 |
| Methyl cellulose (low viscosity) | 1.497 | 423 |
| Polyurethane | 1.5–1.6 | 200–400 |
| Poly(1,2-butadiene) | 1.5000 | 269 |
| Polyvinyl formal | 1.50 | |
| Cellulose nitrate | 1.50–1.514 | 326 |
| Poly(2-heptyl-1,3-butadiene) | 1.5000 | 190 |
| Poly(2-isopropyl-1,3-butadiene) | 1.5028 | 221 |
| Polypropylene (density: 0.9075 g/cm³) | 1.5030 | 260 |
| Polyisobutene | 1.505–1.51 | 200 |
| Polybornyl methacrylate | 1.5059 | 383 |
| Poly(2-t-butyl-1,3-butadiene) | 1.5060 | 293 |
| Polyethylene glycol dimethacrylate | 1.5063 | |
| Polycyclohexyl methacrylate | 1.5066 | 356 |
| Guttapercha (β) | 1.509 | 215 |
| Polyoxyethylene (high-molecular weight) | 1.51–1.54 | 232 |
| Polyethylene (density: 0.914 g/cm³) | 1.51 | 148 |
| Poly(2-hydroxyethyl methacrylate) | 1.5119 | 328 |
| Polybutene (isotactic) | 1.5125 | 249 |
| Guttapercha (α) | 1.514 | 215 |
| Poly(1,3-butadiene) | 1.5154 | 269 |
| Poly(2-chloroethyl methacrylate) | 1.517 | 365 |
| Poly(2-diethylaminoethyl methacrylate) | 1.5174 | 289 |
| Natural rubber | 1.519–1.52 | 200 |
| Polyacrylonitrile | 1.52 | |
| Polymethacrylonitrile | 1.52 | |
| Polyisoprene | 1.521 | 200 |
| Polyacrylic acid | 1.527 | 379 |
| Poly(1-vinyl-2-pyrrolidone) | 1.53 | 327 |
| Cellulose | 1.54 | 243–443 |
| Polyvinyl chloride | 1.54–1.55 | 354 |
| Poly(2-bromoethyl methacrylate) | 1.5426 | 325 |
| Poly(N-allyl methacrylamide) | 1.5476 | 433 |
| Polyisopropyl methacrylate | 1.552 | 354 |
| Poly(p-isopropyl styrene) | 1.554 | 360 |
| Polychloroprene | 1.554–1.558 | 253 |
| Polybenzyl methacrylate | 1.5680 | 327 |
| Polyphenyl methacrylate | 1.5706 | 383 |
| Poly(oxy-2,6-dimethylphenylene) | 1.575 | 482 |
| Polyoxyethylene oxyterephthaloyl (amorphous) | 1.5750 | 342 |
| Polyvinyl benzoate | 1.5775 | 344 |
| Poly(4-methoxy-2-methylstyrene) | 1.5868 | 358 |
| Poly(o-methylstyrene) | 1.5874 | 409 |
| Polystyrene | 1.59–1.592 | 373 |
| Poly(o-methoxystyrene) | 1.5932 | 348 |
| Poly(p-methoxystyrene) | 1.5967 | 362 |
| Polyvinylidene chloride | 1.60–1.63 | 255 |
| Poly(o-chlorostyrene) | 1.6098 | 392 |
| Poly(2,6-dichlorostyrene) | 1.6248 | 440 |
| Polyvinyl naphthalene | 1.6818 | 432 |
| Polyvinyl carbazole | 1.683 | 423,481 |

Among the above-mentioned polymers, those which have a relatively low Tg and excellent cushioning properties are particularly-preferable, i.e., polyvinyl acetate, polybutadiene, polyvinyl butyral, urethane acrylate resins.

Examples of plasticizers usable in the present invention include polyhydric alcohols, phthalate plasticizers, aliphatic dibasic ester plasticizers, citrate plasticizers, epoxy plasticizers, and phosphate plasticizers.

Examples of preferable polyhydric alcohols are ethylene glycol, diethylene glycol, triethylene glycol, glycerin, trimethylolpropane, etc.

Examples of preferable phthalate plasticizers are dimethyl phthalate (DMP), diethyl phthalate (DEP), dibutyl phthalate (DBP), heptylnonyl phthalate (HNP), di-2-ethylhexyl phthalate (DOP), di-n-octyl phthalate (DNOP), di-i-octyl phthalate (DCapP), phthalic acid (79 alkyl) (D79P), di-i-decyl phthalate (DIDP), ditridecyl phthalate (DTDP), dicyclohexyl phthalate (DCHP), butyl benzyl phthalate (BDP), ethyl phthalyl ethyl glycolate (EPEG), butyl phthalyl butyl glycolate (BPBG), etc.

Examples of preferable aliphatic dibasic ester plasticizers are di-2-ethylhexyl adipate (DOA), adipic acid di(methylcyclohexyl), diisodecyl adipate (DIDA), di-n-hexyl azelate (DNHZ), di-2-ethylhexyl azelate (DOZ), dibutyl sebacate (DBS), di- 2 -ethylhexyl sebacate (DOS), etc.

Examples of preferable citrate plasticizers are triethyl citrate (TEC), tributyl citrate (TBC), acetyl triethyl citrate (ATEC), acetyl tributyl citrate (ATBC), etc.

Examples of preferable epoxy plasticizers are epoxidized soybean oil (EPO), etc.

Examples of preferable phosphate plasticizers are tributyl phosphate (TBP), triphenyl phosphate (TPP), tricresyl phosphate (YCP), tripropylene glycol phosphate, etc.

The thickness of each cushioning layer is in the range of 1 $\mu$m to 1,000 $\mu$m, preferably in the range of 20 $\mu$m to 100 $\mu$m. If the cushioning layer is excessively thin, the cushioning properties are inferior. If the cushioning layer is excessively thick, adverse effects are made on the optical properties (haze, transmittance, etc.).

The amount of plasticizer contained in the binder is in the range of 0 to 80%, preferably in the range of 10% to 50%. If the plasticizer content is excessively low, the effect on the plasticity is low, whereas, an excessively high plasticizer content causes a lowering in the strength of the resulting coating.

If the cushioning layer is a polymer layer comprising an adhesive mass, the polymer layer may be formed by coating an adhesive polymer on a glass substrate in the form of a solution. Alternatively, an adhesive polymer in the form of a film may be laminated on a glass substrate. Either of the described methods is usable in the present invention.

Solution Coating Method

In this method, a solvent-type adhesive is dissolved in a solvent or the like, and the resulting solution is coated on a glass substrate and then dried. Examples of adhesives usable in the present invention include rubber, acrylic and silicone adhesives.

Examples of rubber adhesives usable in the present invention are natural rubber, styrene-butadiene rubber, polyisobutylene rubber, isoprene rubber, etc.

Examples of acrylic adhesives usable in the present invention are copolymers containing 2-ethylhexyl acrylate as a principal monomer, and so forth.

Examples of silicone adhesives usable in the present invention are silicone polymers containing rubber-like siloxane or resinous siloxane as a principal component.

Examples of solvents usable for coating are toluene, Triclene, n-hexane, ethyl acetate, methyl ethyl ketone, etc.

Emulsion adhesives and hot-melt adhesives are also usable.

Film Laminating Method

Figure 2:
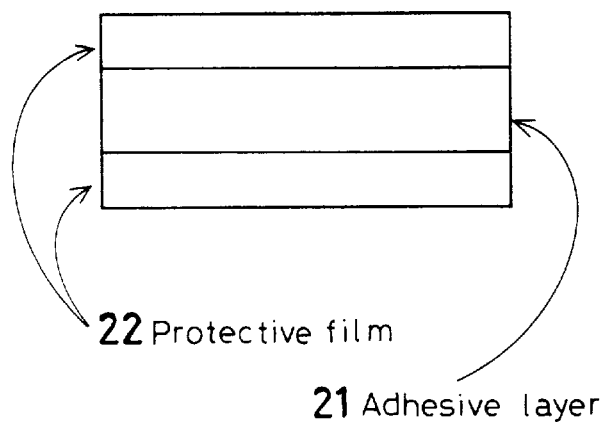
FIGS. 2a and 2b are views for explanation of a film laminating method.
Figure 2:
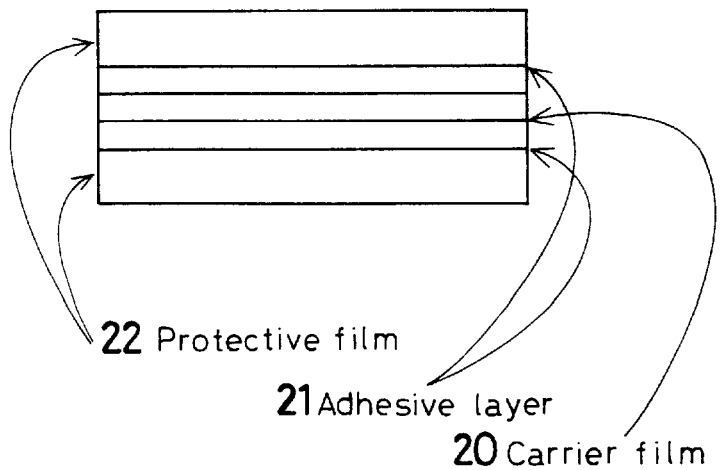

It is possible to use a commercially available double-side adhesive which is formed in the shape of a carrier film from one adhesive selected from among the above. The double-side adhesive is preferably comprised exclusively of an adhesive, as shown in FIG. 2(a). The double-side adhesive shown in FIG. 2(a) comprises an adhesive layer having protective films 22 attached to both sides thereof. In the case of an adhesive cushioning layer wherein adhesive layers 21 are attached to both sides of a carrier film 20, as shown in FIG. 2(b), the film must be made of polypropylene, polyvinyl chloride, etc. which causes no or substantially no polarization. If the carrier film is made of a material which causes polarization, e.g., PET, striped irregularities are undesirably produced in the resulting duplicate.

In addition to the above-described polymers, ionizing radiation curing materials are also usable.

As ionizing radiation curing materials, electron radiation curing resins and ultraviolet curing resins are useful. Electron radiation curing resins and ultraviolet curing resins are similar to each other in terms of the constituents except that the latter resins contain photopolymerization initiator and a sensitizer. Generally, it is preferable to use an ionizing radiation curing material which contains as a principal component a polymer, oligomer or monomer having a radical polymerizable active group in its structure as a film-forming component. As a polymer or oligomer of this type, a commercially available material such as urethane acrylate or polyester acrylate is applicable to the present invention. As a monomer, a commercially available ionizing radiation curing monomer, e.g., an acrylic acid or methacrylic acid derivative, is applicable to the present invention. The above-described ionizing radiation curing resin materials can be employed as ultraviolet curing resin materials by mixing them with a photopolymerization initiator, e.g., acetophenone, benzophenone, Michler's benzoylbenzoate, $\alpha$-aminoxime ester, tetramethyl thiuram monosulfide, thioxanthone, etc., and a photosensitizer, e.g., n-butylamine, triethylamine, tri-n-butylphosphine, etc.

As an ionizing radiation irradiation method, a prior art can be employed as it is. In the case of electron radiation irradiation, for example, an ionizing radiation curing resin material can be cured by irradiating it with electron radiation having an energy of 50 KeV to 1,000 KeV, preferably 100 KeV to 300 KeV, emitted from an electron radiation accelerator selected from among a variety of accelerators, e.g., a Cockcroft-Walton's accelerator, a van de Graaff accelerator, a resonance transformer type accelerator, an insulating core transformer type accelerator, a linear accelerator, a dynamitron accelerator, a high-frequency accelerator, etc., at a dose rate of 0.1 Mrad. to 100 Mrad., preferably 1 Mrad. to 10 Mrad. In the case of ultraviolet irradiation, an ultraviolet curing resin material can be cured by irradiating it with ultraviolet radiation emitted from a light source, e.g., an extra-high pressure mercury lamp, a high-pressure mercury lamp, a carbon arc lamp, a xenon arc lamp, a metal halide lamp, etc., at a dose rate of 0.1 mJ/cm$^2$ to 10,000 mJ/cm$^2$ preferably 10 mJ/cm$^2$ to 1,000 mJ/cm$^2$.

The hologram duplicating apparatus of the present invention will be described below with reference to FIG. 3.

Figure 3:
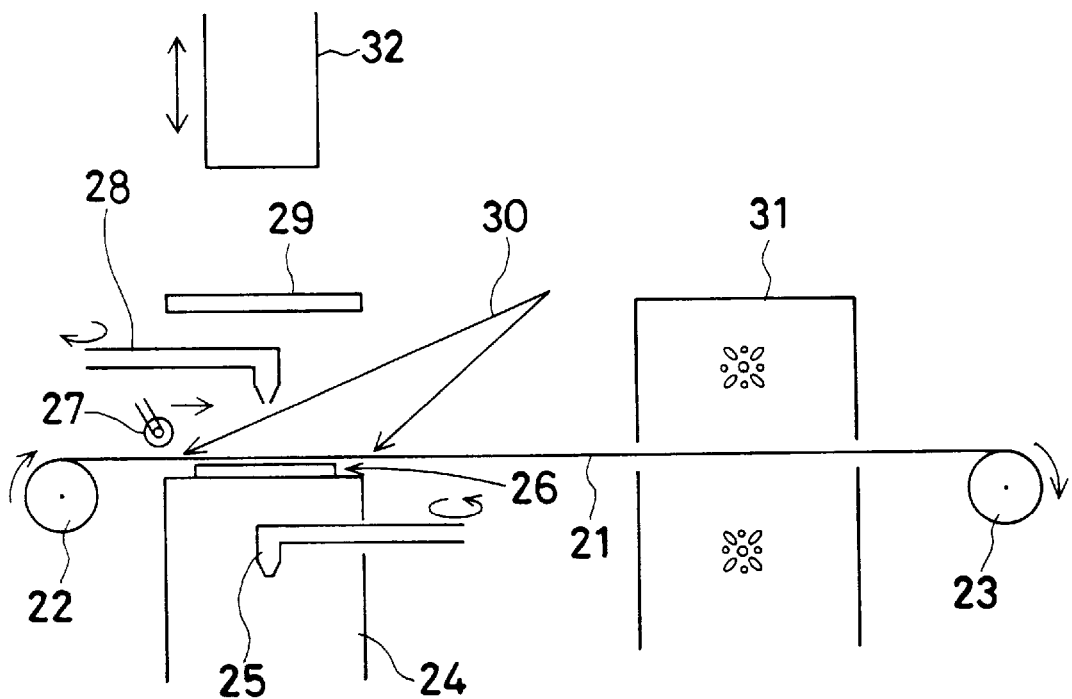
FIG. 3 illustrates the arrangement of a hologram duplicating apparatus according to the present invention.

As shown in FIG. 3, a duplicating photosensitive material film 21 is delivered from a supply roller 22 and taken up by a take-up roller 23. An original plate layer 26 is placed on a vertically movable support 24. A contacting liquid is dropped on the original plate layer 26 from a contacting liquid dropping device 25, and the original plate layer 26 is then brought into close contact with the duplicating photosensitive material film 21 by raising the support 24. An excess of contacting liquid is removed by squeezing with a roller 27. Next, the contacting liquid is dropped on the recording film 21 from a contacting liquid dropping device 28, and the recording film 21 is then brought into close contact with an AR coated ND layer 29. At this time also, an excess of contacting liquid is squeezed out by a roller or the like, and the ND layer 29 is pressed so as to come in close contact with the recording film 21 by a pressing device 32. If the ND layer 29 is so thick that it cannot satisfactorily be squeezed by a roller, the thickness of the ND layer 29 is reduced to 0.1 mm to 1.5 mm. In addition, a polymeric material which causes no double refraction and is equal to the contacting liquid in refractive index is employed for the ND layer 29, thereby making it flexible so that an excess of contacting liquid can satisfactorily be squeezed out. Further, by providing the AR coated ND layer 29 with a cushioning layer, vibration of the contacting liquid can be suppressed during exposure for duplication.

A laser beam 30 that is conjugated with the original plate layer is made incident on the duplicating system thus formed, thereby effecting exposure for duplication. Upon completion of the duplication, the AR coated ND layer 29 is removed, and the recording film 21 is separated from the duplicating system by processing the original plate layer. The separated recording film 21 enters a drying chamber 31 where it is dried to remove the contacting liquid therefrom. The dried film 21 is collected onto the take-up roller 23. These steps are carried out as a series of operations so that duplication is continuously performed. The productivity can be increased by providing a plurality of exposure sections and a plurality of drying sections. [Examples 1 to 3]

The following solutions were each coated on an original plate glass by an applicator. [Example 1]

| | |
|---|---|
| Gelatin (P3829: Nitta Gelatin) | 100 parts by weight |
| Water | 50 parts by weight |
| (solution at 50° C.) | |

[Example 2]

| | |
|---|---|
| Gelatin (P3829: Nitta Gelatin) | 50 parts by weight |
| Glycerin | 40 parts by weight |
| Water | 40 parts by weight |
| (solution at 50° C.) | |

[Example 3]

| | |
|---|---|
| Gelatin (P3829: Nitta Gelatin) | 50 parts by weight |
| Gelatin (Type U: Nitta Gelatin) | 10 parts by weight |
| Glycerin | 40 parts by weight |
| Water | 40 parts by weight |
| (solution at 50° C.) | |

After being coated, each solution was cooled to 0° C. to form a coating film of 50 μm in thickness. Then, the film was dried on heating for 1 hour at 100° C., thereby forming a cushioning layer.

It should be noted that the solution in [Example 2] was also spin-coated on an UV ozone-treated glass substrate at 250 rpm, thereby forming a cushioning layer.

[Example 4]

| | |
|---|---|
| Agar | 100 parts by weight |
| Water | 50 parts by weight |
| (solution at 90° C.) | |

After being coated, the solution was cooled to 0° C. to form a coating film of 50 μm in thickness, thereby producing a cushioning layer (4).

[Examples 5 and 6]

The following solutions were each coated on an original plate glass by an applicator.

[Example 5]

| | |
|---|---|
| Polyvinyl acetate | 100 parts by weight |
| (Gosenyl PV-500: Nippon Synthetic Chemical Industry Co., Ltd.) | |
| Di-2-ethylhexyl phthalate | 30 parts by weight |
| (DOP: Daihachi Kagaku) | |
| Methyl ethyl ketone | 150 parts by weight |
| Toluene | 50 parts by weight |

[Example 6]

| | |
|---|---|
| Polyvinyl butyral | 100 parts by weight |
| (Eslec BX-1: Sekisui Chemical Co., Ltd.) | |
| Di-2-ethylhexyl phthalate | 30 parts by weight |
| (DOP: Daihachi Kagaku) | |
| Methyl ethyl ketone | 150 parts by weight |
| Toluene | 50 parts by weight |

After being coated, each solution was dried on heating for 5 minutes at 100° C., thereby forming a coating film of 50 μm in thickness. Thus, a cushioning layer was produced on each original plate glass.

[Example 7]

The following solution was spin-coated on an original plate glass.

| | |
|---|---|
| Coating type adhesive: | |
| Acrylic copolymer | 100 parts by weight |
| Xylene resin | 10 parts by weight |
| Isophorone di-isocyanate | 1 part by weight |
| Ethyl acetate | 150 parts by weight |

After being coated, the solution was dried on heating for 5 minutes at 100° C., thereby forming a coating film of 50 μm in thickness. Thus, a cushioning layer (7) was produced.

[Example 8]

A double-side adhesive film (Neomask: Nitto Electric Industrial Co., Ltd.) was stuck on an original plate glass by using a rubber roller, thereby producing a cushioning layer (8).

[Example 9]

An ultraviolet curing resin material (Aronix UV-3033: Toa Gosei Chemical Industry Co., Ltd.) was coated to a thickness of 50 μm on an original plate glass and then irradiated with ultraviolet radiation, thereby producing a cushioning layer (9).

[Example 10]

The following solution was spin-coated on an original plate glass.

| | |
|---|---|
| Urethane acrylate (UV-3000B: Nippon Synthetic Chemical Industry Co., Ltd.) | 100 parts by weight |
| Acrylic monomer (Aronix M-101: Toa Gosei Chemical Industry Co., Ltd.) | 100 parts by weight |
| Dipentaerythritol pentaacrylate (Sartomer 399: Sartomer) | 20 parts by weight |

Then, the coated solution was irradiated with electron radiation to thereby produce a cushioning layer of 50 μm in thickness.

[Examples 11 and 12]

In Examples 11 and 12, an UV cured urethane acrylate layer was produced by mixing an initiator (Irgacure 184: Ciba-Geigy Ltd.; 3 to 5 wt %) with the material.

[Example 11]

SC-3120 (The inktec)+Irgacure

[Example 12]

| | |
|---|---|
| N-vinyl-2-pyrrolidone (Toa Gosei Chemical Industry Co., Ltd.) | 50 parts by weight |
| Aronix M-5600 (Toa Gosei Chemical Industry Co., Ltd.) | 50 parts by weight |
| UV-3000B (Nippon Synthetic Chemical Industry Co., Ltd.) | 100 parts by weight |
| HK-20 (Toa Gosei Chemical Industry Co., Ltd.) | 2 parts by weight |

In Examples 11 and 12, the glass (or PMMA) laminating method was employed. That is, the solution was heated to a temperature of 50° C. to 80° C. so as to have a viscosity of not higher than 1,000 cps and dropped on one end of a glass substrate or an acrylic resin material coated with a primer (Chemlock 607 diluted 1:10 with methanol) and heated to the same temperature. Then, a heated glass, which was coated with a parting agent (Moldspat MR-K 681: Asahi Glass Company Ltd.), was placed thereon and pressed so that the solution gradually spread. After UV exposure, the upper glass was separated.

Holograms was produced by using the original plates prepared in Examples 1 to 12. As a result, it was possible to produce excellent duplicate holograms which had minimal defects (Table 1). It should be noted that the results shown in Table 1 were obtained when Omnidex 352 (Du Pont Co., Ltd.) was employed as a duplicating photosensitive material.

In contrast, when duplication was carried out without providing a cushioning layer, a large number of defects due to dust were observed.

TABLE 1

| Examples | Cushioning layer | Coating method | Number of defects* |
|---|---|---|---|
| 1 | gelatin | applicator | 25 |
| 2 | gelatin | applicator | 4.3 |
| 2 | gelatin | spin coating | 1.5 |
| 3 | gelatin | applicator | 1.9 |
| 4 | agar | applicator | 6.8 |
| 5 | polyvinyl acetate | applicator | 30 |
| 6 | polyvinyl butyral | applicator | 30 |
| 7 | adhesive | spin coating | 20 |
| 8 | adhesive | laminating | 10 |
| 9 | ionizing radiation cured film | applicator | 5.6 |
| 10 | ionizing radiation cured film | spin coating | 5.8 |
| 11 | ionizing radiation cured film | glass laminate | 1.0 |
| 12 | ionizing radiation cured film | glass laminate | 0.5 |
| | no cushioning layer | | about 400 |

Note: *Number of defects (mean value) per 5 in. × 5 in.

Thus, since a flexible ND glass or sheet is provided or a cushioning layer is provided on the side of an ND glass which is closer to an optical contacting liquid layer, pressure is uniformly transmitted to the contacting liquid so that the contacting liquid layer can be made uniform and thin in thickness, thereby preventing undesirable flow of the contacting liquid during exposure. Thus, it is possible to produce an excellent duplicate hologram. It is also possible to increase the productivity of duplication of the hologram by feeding the recording film continuously. In addition, a cushioning layer is provided on the inner side of an AR coated ND glass or the upper side of a photosensitive material film, and another cushioning layer is provided on the side of an original plate protecting glass which is closer to an optical contacting liquid layer or on the lower side of the photosensitive material film. With this arrangement, if dust is mixed in, it is held inside the relevant cushioning layer. Thus, it is possible to prevent undesirable flow of the contacting liquid and lifting of the film by foreign substances. Accordingly, duplication of the hologram can be effected without any hindrance.

Evaluation of the properties of the above-described cushioning layers will be explained below.

The properties required for the cushioning layers in terms of the removal of defects due to foreign substances are (1) capability of effectively burying foreign substances therein when a duplicating photosensitive film is brought into close contact with it, and (2) plate wear resistance with which it can be repeatedly used for duplication. Mechanical properties corresponding to these essential properties are (1) "softness" adequate to bury foreign particles in the cushioning layer when such particles are held between the same and the duplicating photosensitive film, and (2) "elasticity" with which depressions formed by burying foreign particles are restored every time the duplicating photosensitive film is separated from the cushioning layer after each exposure process, and with which no undulation occurs in the surface of the cushioning layer when it is squeezed with a roller when the duplicating photosensitive film is brought into close contact with the cushioning layer. To express quantitatively mechanical properties adequate to attain the desired purpose, we devised [1] stylus force-displacement measuring test and [2] pencil scratch test as evaluation testing methods for the above-described two properties, and carried out these evaluation testing methods on several different kinds of cushioning layer. Further, these cushioning layers were actually repeatedly used for hologram duplication to examine the correlation between the incidence of defects and the evaluation test results. The two evaluation testing methods are as follows:

[1] Stylus Force-Displacement Measurement (Purpose) The purpose of this test is to express quantitatively "softness" of a polymer film of several ten μm in thickness coated on a glass substrate.

Figure 4:
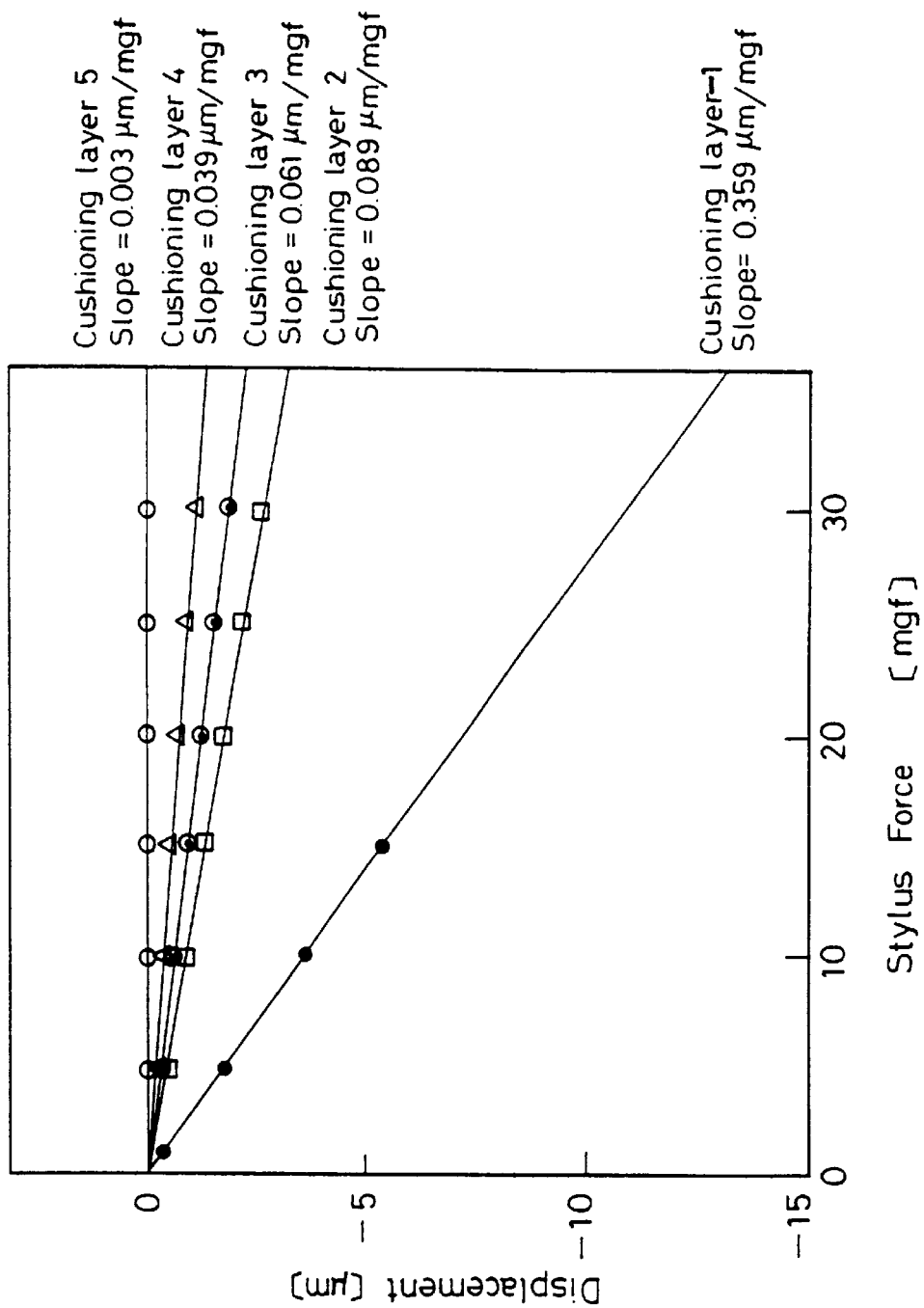
FIG. 4 is a graph showing the results of a stylus force-displacement test carried out on some examples of cushioning layers.

(Method) A surface configuration measuring device for large-sized substrates, Dektak-16000 (ULVAC) is employed. A part of the sample film surface is separated to expose the surface of the glass substrate. With a predetermined load (stylus force) applied to a diamond stylus having a tip diameter of 12.5 μm, the step portion that is defined between the glass substrate and the polymer film at the separated portion is linearly scanned with the diamond stylus. Thus, a difference between vertical coordinates of the stylus, that is, a film thickness, is read at predetermined coordinates (in the scanning direction) of the exposed portion of the glass substrate and the coating film portion. With the stylus force stepwisely varied in the range of 1 mgf to 30 mgf, the same measurement is repeated at the same position. The film thickness is plotted against the stylus force and approximated by a straight line, as shown in FIG. 4. The slope (absolute value) of the straight line obtained represents the displacement (μm) of the film surface per unit stylus force (mgf).

[2] Pencil Scratch Test

[Purpose] The purpose of this test is to obtain an index that represents elasticity (resilience) of a polymer film of several ten μm in thickness coated on a glass substrate.

(Method) A device (pencil scratch tester) defined by JIS K5401 and pencils (6H to 5 B) defined by JIS S6006 are employed. The testing method is carried out according to JIS K 5400 6.14 "Pencil scratch test". In the present invention, however, the load that is applied to the pencil is set at 50 g.

The stylus force-displacement measurement and pencil scratch test were carried out on the following five different kinds of cushioning layer. The thickness of the cushioning layers were in the range of 20 μm to 50 μm.

(Cushioning layer 1)

A solution of the following composition was spin-coated on a glass substrate and then dried by allowing it to stand for 1 day at room temperature.

| Gelatin (Collotype-I: Nitta Gelatin) | 10 parts by weight |
|---|---|
| Glycerin (Junsei Kagaku) | 40 parts by weight |
| Water | 50 parts by weight |

(Cushioning layer 2)

A solution of the following composition was dropped on one end of a glass substrate, and a glass (cover glass) coated with a parting agent (Moldspat MR-K681: Asahi Glass Company Ltd.) was placed thereon and pressed so that the solution spread uniformly. After curing by irradiation with ultraviolet radiation, the cover glass was separated.

| Soft coat (SC-3120: The Inktec) | 100 parts by weight |
|---|---|
| Photopolymerization initiator (Irgacure 184: Ciba-Geigy Ltd.) | 4 parts by weight |

(Cushioning layer 3)

The following solution was spin-coated on a glass substrate, and after being irradiated with ultraviolet radiation, it was dried on heating (for 2 hours at 120° C.).

Photosensitive material for holography (Omnidex 352: Du Pont Co., Ltd.)

(Cushioning layer 4)

With a solution of the following composition used, the same procedure as in the case of the cushioning layer 2 was carried out.

| Monomer (Aronix M-150: Toa Gosei Chemical Industry Co., Ltd.) | 25 parts by weight |
|---|---|
| Monomer (Aronix M-5600: Toa Gosei Chemical Industry Co., Ltd.) | 25 parts by weight |
| Urethane acrylate (UV-3000B: Nippon Synthetic Chemical Industry Co., Ltd.) | 50 parts by weight |
| Monomer (HK-2: Toa Gosei Chemical Industry Co., Ltd.) | 1 part by weight |
| Photopolymerization initiator (Irgacure 184: Ciba-Geigy Ltd.) | 4 parts by weight |

(Cushioning layer 5)

The following solution was coated on a glass substrate by an applicator and thereafter cured by irradiation with electron radiation.

Urethane acrylate (PR-202: Mitsubishi Chemical Industries, Ltd.) FIG. 4 is a graph showing the results of the stylus force-displacement test carried out on the above-described five different kinds of cushioning layer. It should be noted that the axis of ordinates in the graph represents not the film thickness but the displacement of the film thickness. In addition, numerals in the graph represent the slopes of the straight lines.

Next, the pencil scratch test was carried out on the same samples. The results of the test are shown in Table 2 below. It should be noted that a higher hardness symbol represents a higher pencil scratch value, and the results expressed by inequality signs each show that the hardness of the cushioning layer is outside the hardness range of the pencil used.

TABLE 2

(result of pencil scratch test on each cushioning layer)

| Cushioning layer | Pencil scratch value |
|---|---|
| 1 | <5B |
| 2 | >6H |
| 3 | <5B |
| 4 | >6H |
| 5 | <5B |

The cushioning layers (1 to 5) on the respective glass substrates were each repeatedly used for hologram duplication 10 times by using an apparatus as shown in FIG. 3, with the glass substrate brought into close contact with an original plate unit through an optical contacting liquid, and with the cushioning layer brought into close contact with a duplicating film through an optical contacting liquid, to examine a number of defects (per 5 in$^2$) generated in a hologram produced by each duplication process and the condition of undulation of the cushioning layer surface. The results of the measurement are shown in Table 3 below, together with the results of the stylus force-displacement measurement and pencil scratch test.

TABLE 3 relationship between the number of times of repeated duplication, the slope of the stylus force-displacement straight line, the pencil scratch value, the number of defects and the condition of undulation

| Cushioning layer | Slope of stylus force-displacement straight line (μm/mgf) | Pencil scratch value | Number of times of duplication | Number of depression-shaped defects 1/(5 × 5 inch$^2$)* | Undulation |
|---|---|---|---|---|---|
| 1 | 0.359 | <5B | 1 | 6 (5) | very large |
|   |       |     | 10 | 37 (24) |   |
| 2 | 0.089 | >6H | 1 | 5 (5) | medium |
|   |       |     | 10 | 8 (8) |   |
| 3 | 0.061 | <5B | 1 | 5 (4) | large |
|   |       |     | 10 | 8 (4) |   |
| 4 | 0.039 | >6H | 1 | 2 (2) | small |
|   |       |     | 10 | 8 (8) |   |
| 5 | 0.003 | <5B | 1 | 58 (uncounted) | unexamined |
| No layer | — | — | 1 | more than 400 (uncounted) | — |

Note: *)numerals in the parentheses each represent the number of depression-shaped defects containing foreign particles among the total number of defects.

From the above examination, the following conclusion may be drawn:

In the four cushioning layers (1 to 4) where the slope of the stylus force-displacement straight line exceeds 0.003 μm/mgf, the number of defects occurring during the first duplication was small, that is, substantially equal (not larger than 6) to each other, whereas, in the cushioning layer 5 having a smaller slope than those of the cushioning layers 1 to 4, a number of defects which was about 10 times that of the cushioning layers 1 to 4 occurred. Thus, the cushioning layer 5 cannot be put to practical use. Accordingly, it will be understood that the cushioning layer in the present invention must have a stylus force-displacement straight line slope of at least 0.003 μm/mgf.

In the cushioning layers 1 and 3 whose pencil scratch values are lower than 5 B, the ratio of depression-shaped defects where no foreign particle can be found becomes higher as the cushioning layers 1 and 3 are repeatedly used. On the other hand, in the cushioning layers 2 and 4 whose pencil scratch values are higher than 6 H, the above-described ratio is lower than that of the cushioning layers 1 and 3. In addition, there is a difference in terms of undulation between the cushioning layers 1 and 3 on the one hand and the cushioning layers 2 and 4 on the other. That is, if the pencil scratch value is lower than 6 H, undulation markedly occurs during the repeated use. Therefore, such a cushioning layer cannot withstand repeated use.

Figure 5A:
FIGS. 5a and 5b are photographs showing a reconstructed image of traces of foreign substances recognized when a hologram produced by using a cushioning layer of the present invention is observed with an optical microscope.
Figure 5B:
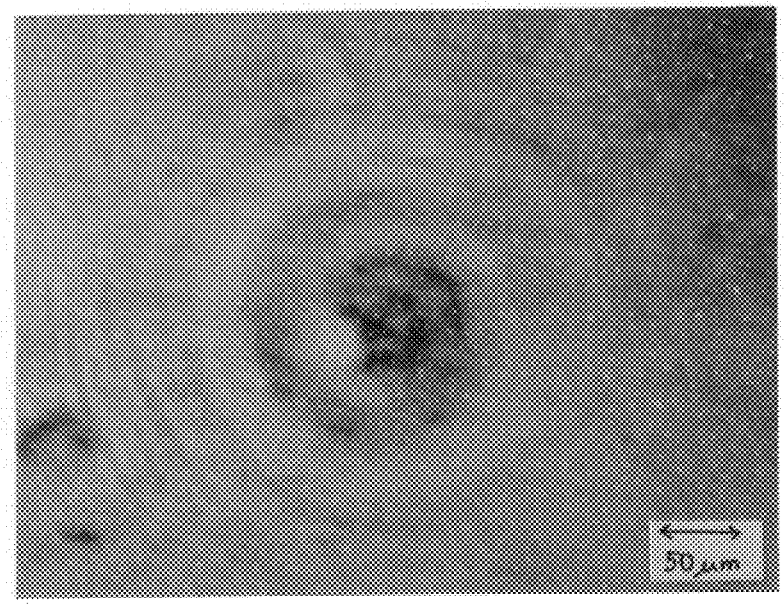

If the center of a depression-shaped defect in a hologram which is produced by duplication without using a cushioning layer is observed by using an optical microscope (MHL 100: Olympus Optical Co., Ltd.) at a magnification of 50 to 200 by the reflected- or incident-light illumination dark-field observation method, it is revealed that the observed portion contains holographical record of a foreign substance itself (smaller than about 10 μm) or a distorted portion (a crater-shaped dark portion of several 10 μm to about 200 μm in diameter) of the duplicating film where it is locally pressed by a foreign substance. If a portion of a hologram duplicatively produced by using the cushioning layer 5 where no depression-shaped defect is recognized is observed by the same method as the above, it is revealed that the observed portion contains the record of a foreign substance or a distortion of the surface region of the cushioning layer due to a foreign substance in the same way as the above. FIG. 5(*a*) is a photograph of a reconstructed image of a foreign substance itself observed by the above-described method (magnification: 200; film: FUJI FP-3000B SUPER, ISO3200; and exposure time: 12.25 sec.). FIG. 5(*b*) is a photograph of a reconstructed image of a portion of a cushioning layer that is distorted by a foreign substance on the film (magnification: 200; film: the same as the above; and exposure time: 13.37 sec.). If duplication is carried out without employing a cushioning layer, such a foreign substance would press the duplicating film, causing the reconstructed image to have a depression-shaped defect of the order of several hundred μm to several mm in diameter. However, when a cushioning layer is employed, even if a foreign substance is present, it is effectively buried in the cushioning layer so as not to press the film. It is therefore possible to prevent occurrence of a depression-shaped defect. However, in a hologram produced by duplication using a cushioning layer, a portion where no depression-shaped defect is present contains the record of traces of foreign substances as microscopically recognized by observation using an optical microscope, as shown in FIGS. 5(*a*) and 5 (*b*).

Thus, by providing a cushioning layer, which contains as a principal component a polymer of high elasticity having a slope greater than 0.003 μm/mgf in the stylus force-displacement measurement, on the side of an anti-reflection coated glass, an ND glass or an original plate protecting glass which is closer to the photosensitive material film, or on the side of the film which is closer to the glass, even if a foreign substance enters the area between the glass and the film, it is effectively buried in the cushioning layer, thereby preventing undesirable flow of the contacting liquid and lifting of the film. Thus, it is possible to produce a hologram capable of forming a reconstructed image where no defect is recognized by visual observation, although the hologram contains the record of microscopic traces of foreign substances which can be recognized with an optical microscope.

The following is a description of examples in which the optical contacting liquid contains a surface active agent.

Figure 6:
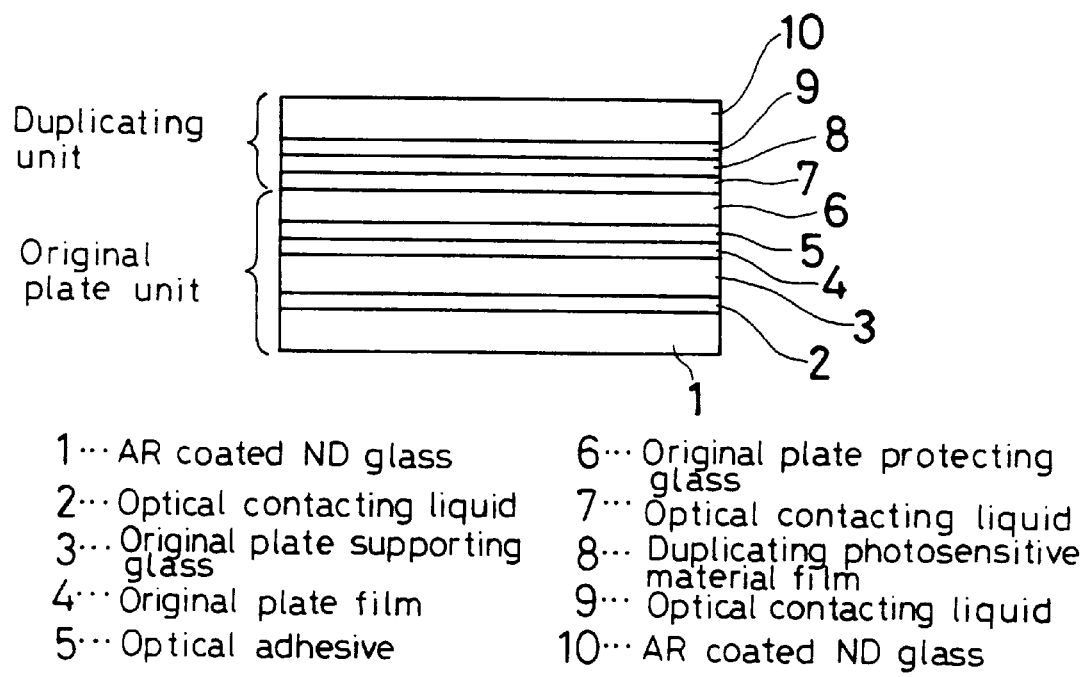
FIG. 6 is a view for explanation of another example of the hologram duplicating method according to the present invention.

FIG. 6 shows an example of a hologram that employs a flexible ND glass provided with an anti-reflection (AR) coating. On the AR coated ND glass 1, an original plate supporting glass 3 is placed in close contact with it through an optical contacting liquid 2. An original plate film 4 is supported by the supporting glass 3, and an original plate protecting glass 6 is bonded to the original plate film 4 with an optical adhesive 5, thereby forming an original plate unit. On the original plate unit, a duplicating photosensitive material film 8 is placed with an optical contacting liquid 7 interposed therebetween, and an optical contacting liquid 9 and an AR coated ND glass 10 are successively stacked up on the film 8, thereby forming a duplicating unit. The AR coated ND glass 10 is made flexible by reducing the thickness thereof to the range of 0.1 mm to 1.5 mm. When the AR coated ND glass 10 is pressed in close contact with the duplicating photosensitive material film 8 with the optical contacting liquid 9 interposed therebetween, since the glass 10 is flexible, the pressure is uniformly transmitted to the optical contacting liquid 9, so that the optical contacting liquid 9 can be made uniform and extremely thin in thickness.

Figure 7:
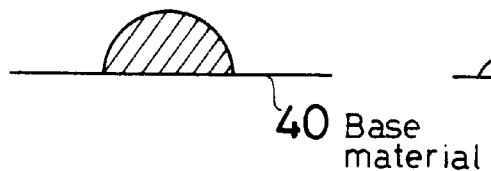
FIGS. 7a and 7b are views for explanation of the wettability of an optical contacting liquid employed in the present invention.
Figure 7:
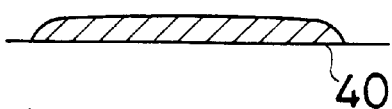
Figure 8:
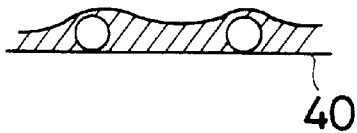
FIGS. 8a and 8b are views for explanation of the wettability of an optical contacting liquid employed in the present invention.
Figure 8:
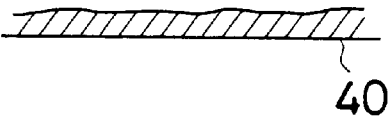

In the present invention, the optical contacting liquid that is employed to form each layer is allowed to contain a cationic, anionic, ampholytic or nonionic surface active agent, thereby improving the wettability with respect to the base material and thus preventing trapping of air. For instance, if an optical contacting liquid alone is dropped on a base material 40, it becomes spherical, as shown in FIG. 7(*a*), because of the surface tension thereof. In contrast, if a surface active agent is added to the optical contacting liquid, the liquid spreads over the base material 40, as shown in FIG. 7(*b*), because of the improvement in the wettability with respect to the base material 40. If the optical contacting liquid alone is dropped on the base material 40 and spread thereover, air is trapped in the optical contacting liquid as air bubbles, as shown in FIG. 8(*a*), whereas, if the optical contacting liquid, which contains a surface active agent, is spread over the base material 40, it can be uniformly coated without trapping of air, as shown in FIG. 8(*b*).

Thus, if exposure is carried out with the original plate unit and the duplicating unit brought into close contact each other using an optical contacting liquid containing a surface active agent, since the optical contacting liquid is free from trapping of air and can be made uniform and extremely thin in thickness, the hologram image can be duplicated excellently. That is, in a case where the original plate is a reflection hologram, when a laser beam is made incident from the duplicating unit side, diffracted light from the original plate and the incident laser light interfere with each other in the duplicating photosensitive material film 8. Thus, the hologram image can be duplicated satisfactorily.

It should be noted that if a surface active agent having antistatic properties is used, it is also possible to prevent trapping of air due to static electrification. If a surface active agent having anti-foaming properties is used, it is also possible to prevent foaming due to mechanical transport or stirring during the supply of the optical contacting liquid.

Surface active agents which are usable in the present invention will be explained below.

Examples of cationic surface active agents usable in the present invention include primary amine salts, secondary amine salts, tertiary amine salts, quaternary ammonium salts, etc.

Examples of anionic surface active agents usable in the present invention include carboxylatesr sulfates, sulfonates, phosphates, etc.

Examples of ampholytic surface active agents usable in the present invention include amino acid type ampholytic surface active agents, betaine type ampholytic surface active agents, etc.

Examples of nonionic surface active agents usable in the present invention include various kinds of alcohol, polyethylene glycol type nonionic surface active agents, polyhydric alcohol type nonionic surface active agents, etc.

Surface active agents are used for a variety of purposes, for example, wetting agents, penetrating agents, foaming agents, anti-foaming agents, emulsifying agents, antistatic agents, etc. In the present invention, wetting properties, which are concerned with wettability, anti-foaming properties for suppressing foaming, and antistatic properties for preventing static electrification are important factors.

As a surface active agent which is excellent in wetting properties, a sulfonate type surface active agent, a sulfate type surface active agent, or a nonionic surface active agent having a large HLB value is suitable for the present invention.

As a surface active agent which is excellent in anti-foaming properties, a lower alcohol or a nonionic surface active agent having a low ELB value is suitable for the present invention.

Examples of surface active agents which are excellent in antistatic properties and suitable for the present invention include anionic, cationic and ampholytic surface active agents.

As an optical contacting liquid, it is preferable to use a liquid having a refractive index close to that of a base material used.

The refractive indices of main compounds, which are usable as an optical contacting liquid, are shown in Table 4.

TABLE 4

| Compounds | Refractive index |
| --- | --- |
| Acrylaldehyde | 1.39975 |
| Acetylacetone | .45178 |
| Acetaldehyde | .33157 |
| Acetonitrile | .34596 |
| Acetophenone | .53427 |
| Acetone | .35886 |
| Anisole | .51503 |
| Aniline | .58629 |
| Allyl alcohol | .41152 |
| Isooctane | .3916 |
| Isoquinoline | .62233 |
| Isobutyl alcohol | .39396 |
| Indene | .5768 |
| Ethanol | .36232 |
| Ethylbenzene | .4994 |
| Ethylene glycol | .42743 |
| Ethylenediamine | .45400 |
| Benzoyl chloride | .55369 |
| Octane | .39755 |
| Formic acid | .37137 |
| Ethyl formate | .35985 |
| o-xylene | .50777 |
| m-xylene | .49962 |
| p-xylene | .49734 |
| Valeric acid | .40433 |
| Quinoline | .62450 |
| Glycerin | .4746 |
| 1-chloronaphthalene | .63321 |
| Chlorobenzene | .52479 |
| Chloroform | .44671 |
| Acetic acid | .37182 |
| Ethyl acetate | .37257 |
| Diethylamine | .38730 |
| Diethyl ether | .3542 |
| 1,1-diethoxyethane | .38193 |
| Carbon tetrachloride | .46072 |
| Dioxane | .4224 |
| Cyclohexanol | .46055 |
| Cyclohexanone | .4507 |
| Cyclohexane | .42680 |
| Cyclohexene | .4465 |
| Cyclopentane | .40609 |
| 1,2-dichloroethane | .44439 |
| Dichloromethane | .42721 |
| Dibromomethane | .54463 |
| Ethyl bromide | .42406 |
| Styrene | — |
| Thiophenol | .58613 |
| Thiophene | .52853 |

TABLE 4-continued

| Compounds | Refractive index |
|---|---|
| cis-decalin | .4810 |
| trans-decalin | .4695 |
| Decane | 1.41203 |
| 1-decene | .4215 |
| Tetrachloroethylene | .50547 |
| Tetrahydrofuran | .404 |
| Trimethylamine | .40032 |
| Trichloroacetaldehyde | .45572 |
| Trichloronitromethane | .46075 |
| o-toluidine | .57276 |
| Toluene | .49782 |
| Nicotine | .52392 |
| Nitroethane | .39007 |
| Nitrobenzene | .55319 |
| Nitromethane | .38133 |
| Carbon disulfide | .62801 |
| (+)-a-pinene | .46634 |
| Pyridine | .50919 |
| Pyrrole | .50347 |
| Phenylhydrazine | .60813 |
| Phenol | .54247 |
| Butadiene | .422 |
| 1-butanol | .39931 |
| 2-butanol | .39743 |
| t-butyl alcohol | .38779 |
| Butyraldehyde | .38433 |
| Furan | — |
| Furfural | .52608 |
| 1-propanol | .38543 |
| 2-propanol | .38126 |
| Propionic acid | .38659 |
| 1-bromonaphthalene | .65876 |
| Bromobenzene | .55977 |
| Bromoform | .5890 |
| Hexane | .37536 |
| 2-hexane | .39889 |
| Heptane | .38777 |
| Benzylamine | .54406 |
| Benzaldehyde | .54638 |
| Benzene | .47439 |
| Benzonitrile | .52570 |
| 1-pentanol | .41173 |
| Pentane | .35801 |
| Formamide | .44530 |
| Mesitylene | .49804 |
| Methanol | .33001 |
| Methylal | .35344 |
| Methylcyclohexane | .42531 |
| 2-methylpyridine | .499 |
| Methyl iodide | .52973 |
| Iodobenzene | .62145 |
| Butyric acid | .39789 |
| Diethyl sulfide | .43055 |

It is also possible to use Exxol DSP (refractive index: 1.405), Exxol D30 (1.437), Exxol D40 (1.445), Exxol D100 (1.445), Isoper E (1.404), Isoper G (1.417), Isoper H (1.424), Isoper L (1.427), and Isoper M (1.436), which are available from Exxon Kagaku, and Series AA (1.400 to 1.458), Series A (1.460 to 1.640), and Series B (1.642 to 1.700), which are available from Cargel.

In addition, a desired refractive index can be obtained by properly mixing together a plurality of compounds selected from among those described above.

[Example 13]

An optical contacting liquid having the following composition was used.

| Xylene | 95 parts by weight |
|---|---|
| Nonionic surface active agent (Emulgen 903: Kao Corporation) | 5 parts by weight |

[Example 14]

An optical contacting liquid having the following composition was used.

| Isoper L (Exxon Kagaku) | 40 parts by weight |
|---|---|
| Series A (Cargel) | 43 parts by weight |
| Nonionic surface active agent (Leodole tw-S320: Kao Corporation) | 3 parts by weight |
| Ampholytic surface active agent (Anon BDF: Nippon Oils & Fats Co., Ltd.) | 1 part by weight |

When the optical contacting liquids of Examples 13 and 14 were used, there were substantially no defects due to trapping of air during duplication.

Thus, by adding a surface active agent to the optical contacting liquid, mingling of air is prevented. Accordingly, excellent duplication can be effected. If a surface active agent having antistatic properties is used, it is possible to prevent trapping of air due to static electrification. If a surface active agent having anti-foaming properties is used, it is also possible to prevent foaming due to mechanical transport or stirring during the supply of the optical contacting liquid.

The following is a description of examples in which an optical contacting liquid which is less fluidic and has a high viscosity of 100 cps to 10,000 cps is used as a material serving as both a cushioning layer and a contacting liquid in the formation of each layer in the layer configuration shown in FIG. 6. Examples of such optical contacting liquids include liquid oligomers, polymer solutions, etc.

Examples of liquid oligomers usable in the present invention include liquid polyurethane, liquid polyester, liquid polybutadiene, liquid polyisoprene, etc.

As a polymer solution, it is possible to use one in which a polymer is dissolved at a concentration suitable for attaining the above-described viscosity. In this solution, the polymer serves as a thickening agent. Various combinations of a polymer and a solvent may be used. It is, however, necessary to select a solvent which causes no damage to the original plate and the duplicating film. It is also possible to add a surface active agent to the solution in order to prevent trapping of air.

Thus, since the optical contacting liquid is free from trapping of air and made uniform and extremely thin in thickness, the hologram image can be duplicated excellently. That is, in a case where the original plate is a reflection hologram, when a laser beam is made incident from the duplicating unit side, diffracted light from the original plate and the incident laser light interfere with each other in the duplicating photosensitive material film 8. Thus, the hologram image can be duplicated satisfactorily.

When the optical contacting liquid is a liquid substance comprising an ionizing radiation curing polymer, monomer or the like, it may be polymerized through a curing reaction caused by irradiation with ionizing radiation during or after the duplication process, thereby making it separable from the recording film.

[Example 15]

As an optical contacting liquid, the following solution was used.

Liquid polybutadiene
Viscosity 200 cps

[Example 16]

As an optical contacting liquid, the following solution was used.

| | |
|---|---|
| Anisole | 70 parts by weight |
| Polyvinyl acetate | 30 parts by weight |
| (Nippon Synthetic Chemical Industry Co., Ltd.) | |
| Viscosity 1,000 cps | |

With the optical contacting liquids of Examples 15 and 16, it was possible to produce holograms having minimal defects.

[Example 17]

As an optical contacting liquid, the following solution was used.

| | |
|---|---|
| Urethane acrylate | 95 parts by weight |
| (PR-202: Mitsubishi Chemical Industries, Ltd.) | |
| Photopolymerization initiator | 5 parts by weight |
| (Irgacure 184: Ciba-Geigy Ltd.) | |
| Viscosity 300 cps | |

[Example 18]

As an optical contacting liquid, the following solution was used.

| | |
|---|---|
| Urethane acrylate | 80 parts by weight |
| (PR-202: Mitsubishi Chemical Industries, Ltd.) | |
| Acrylic monomer | 15 parts by weight |
| (Blemmer GLM: Nippon Oils & Fats Co., Ltd.) | |
| Photopolymerization initiator | 5 parts by weight |
| (Irgacure 184: Ciba-Geigy Ltd.) | |
| Viscosity 4,000 cps | |

With the optical contacting liquids of Examples 17 and 18, it was possible to produce holograms having minimal defects. When ultraviolet radiation was applied to the optical contacting liquids, they became set and were each capable of being removed from the film with ease.

Thus, a high-viscosity optical contacting liquid, which is less fluidic, can be used as a material that functions as both an optical contacting liquid and a cushioning layer for a flexible ND glass or sheet or an ND glass.

The following is a description of examples in which the AR coated ND glass 10 shown in FIG. 6 is made flexible.

In FIG. 6, the AR coated ND glass 10 is reduced in thickness to the range of 0.1 mm to 1.5 mm so as to become flexible. When the AR coated ND glass 10 is pressed in close contact with the duplicating photosensitive material film 8 with the optical contacting liquid 9 interposed therebetween, since the glass 10 is flexible, the pressure is uniformly transmitted to the optical contacting liquid 9, so that the contacting liquid 9 can be made uniform and extremely thin in thickness. When exposure is carried out in this state, since the optical contacting liquid is extremely thin, there is no undesirable flow of the liquid. That is, in a case where the original plate is a reflection hologram, when a laser beam is made incident from the duplicating unit side, diffracted light from the original plate and the incident laser light interfere with each other in the duplicating photosensitive material film 8. Thus, the hologram image can be duplicated excellently.

Figure 9:
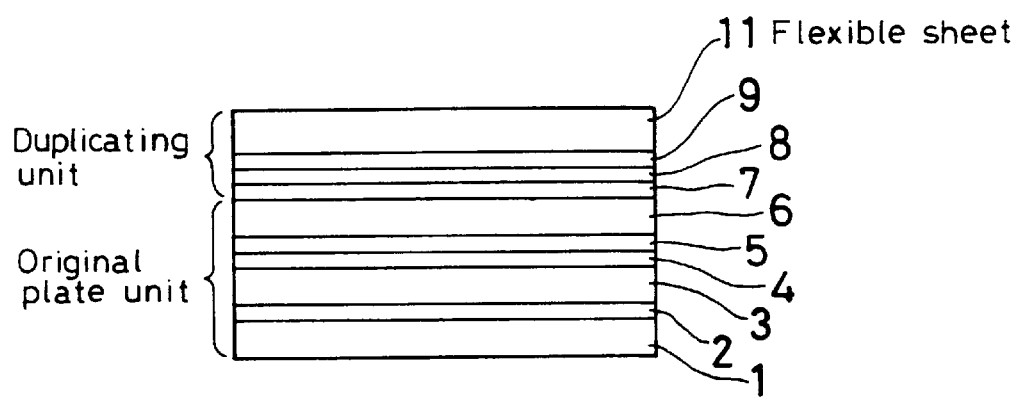
FIG. 9 is a sectional view of a layer configuration in which a sheet of a polymeric material is employed.

FIG. 9 shows an example in which a flexible sheet 11 made of a polymeric material that satisfies the required optical conditions is provided in place of the thin AR coated ND glass in FIG. 6. As the sheet 11 made of a polymeric material, a sheet that causes no double refraction and has been subjected to anti-reflection treatment and that is equal to the optical contacting liquid in refractive index is used. Since the sheet 11 itself is flexible, when pressure is applied thereto, the optical contacting liquid can be made uniform and extremely thin in thickness, and no undesirable flow of the optical contacting liquid occurs during exposure, in the same way as in the case of FIG. 6. Accordingly, the hologram image can be duplicated excellently.

Figure 10:
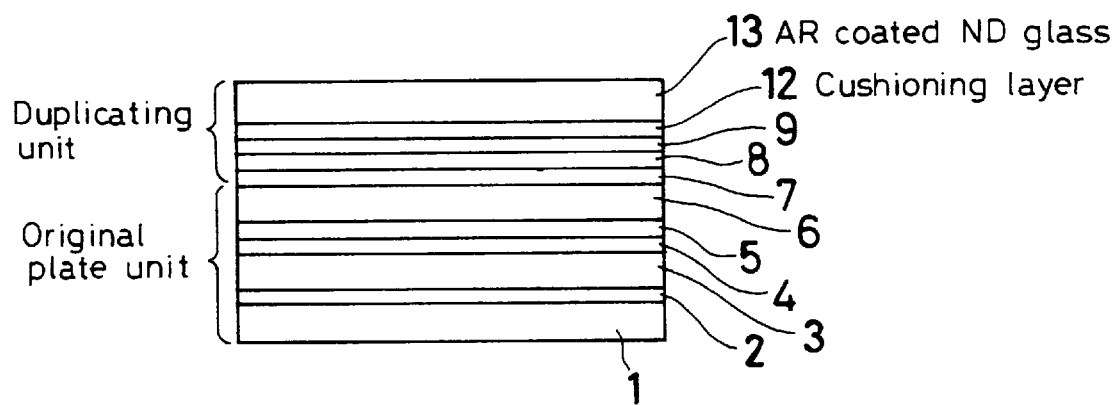
FIG. 10 is a sectional view of a layer configuration in which a cushioning layer is provided.

FIG. 10 shows an example in which a cushioning layer 12 is provided on the inner side of a rigid AR coated ND glass 13. By virtue of the presence of the cushioning layer 12, force acts uniformly on the optical contacting liquid, so that the optical contacting liquid can be made uniform and thin in thickness in the same way as in the case of FIG. 1. Accordingly, no undesirable flow of the optical contacting liquid occurs during exposure, and it is possible to duplicate the hologram image excellently.

Thus, a flexible ND glass or sheet is provided, or a cushioning layer is provided on the side of an ND glass which is closer to an optical contacting liquid, thereby allowing pressure to be uniformly transmitted to the contacting liquid so that the contacting liquid can be made uniform and thin in thickness. Thus, it is possible to eliminate undesirable flow of the contacting liquid during exposure and hence produce an excellent hologram by duplication. It is also possible to increase the productivity of the hologram duplication by feeding the recording film continuously.

Next, a method of duplicating a hologram by using a spacer will be explained with reference to FIGS. 11 to 16.

Figure 11:
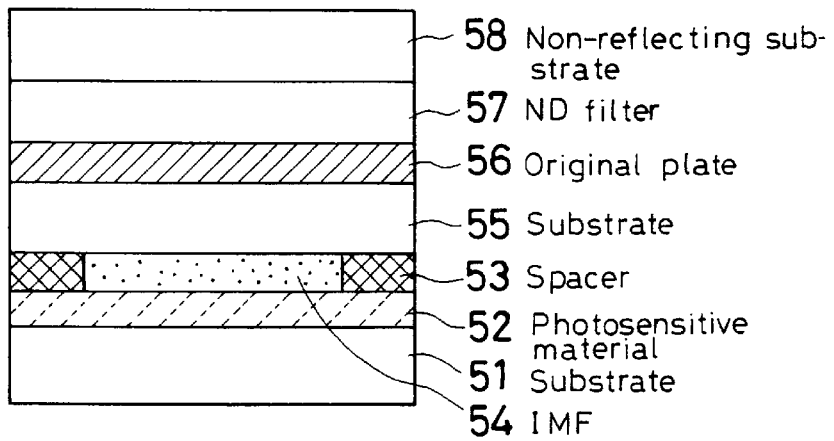
FIGS. 11 to 13 are views for explanation of a method of duplicating a transmission hologram.

Referring to FIG. 11, a rigid spacer 53 is disposed on the periphery of a photosensitive material 52 supported by a substrate 51, and the space that is defined by the spacer 53 is filled with an optical contacting liquid 54. Then, a substrate 55 for supporting a transmission hologram original plate 56 is brought into close contact with the spacer 53 and the optical contacting liquid 54 from thereabove. On the original plate 56 are successively stacked up an ND glass 57 for damping the back reflection component and a substrate 58 provided with an anti-reflection coating in order to prevent surface reflection. Although the optical contacting liquid 54 is a syrupy liquid, the substrate 55 is brought into contact with the spacer 53 by the pressure applied from above it, so that the gap between the photosensitive material 52 and the substrate 55 is maintained at a predetermined level. As a result, the thickness of the optical contacting liquid 54 is maintained at a predetermined level. By virtue of the presence of the spacer 53, the thickness of the optical contacting liquid 54 can be made uniform within a short time without the need to apply a very high pressure.

As to the spacer 53, either a circular spacer or a plurality of divided spacers may be provided on the periphery of the photosensitive material 52. If glass or plastic beads having the same refractive index as that of the optical contacting liquid 54 are dispersed in the optical contacting liquid 54, it is possible to maintain a predetermined gap equal to the diameter of the beads simply by coating the dispersion on the upper side of the photosensitive material 52 and pressing the substrate 55.

If reconstruction light is applied from the upper side with a predetermined gap maintained between the photosensitive material 52 and the substrate 55 as described above, the reconstruction light and the diffracted light from the original plate 56 interfere with each other in the photosensitive material 52. Thus, a hologram image of the original plate 56 can be duplicated efficiently without undesirable flow of the optical contacting liquid 54.

Figure 12:
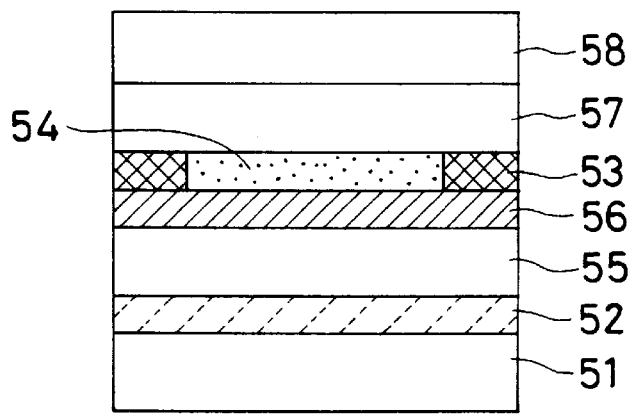

FIG. 12 shows an embodiment in which the spacer 53 is disposed between the original plate 56 and the ND glass 57. In this embodiment, the substrate 55 and the original plate 56 are successively stacked up on the photosensitive material 52 supported by the substrate 51, and the spacer 53 is disposed on the original plate 56. Then, the space defined by the spacer 53 is filled with the optical contacting liquid 54, and the ND glass 57 and the anti-reflection substrate 58 are successively stacked thereon. When the resulting structure is pressed from above it, the thickness of the optical contacting liquid 54 between the original plate 56 and the ND glass 57 can be made uniform within a short time, and a predetermined gap is maintained. If reconstruction light is applied from the upper side in this state, the reconstruction light and the diffracted light from the original plate 56 interfere with each other in the photosensitive material 52. Thus, a hologram image of the original plate 56 is duplicated satisfactorily.

Figure 13:
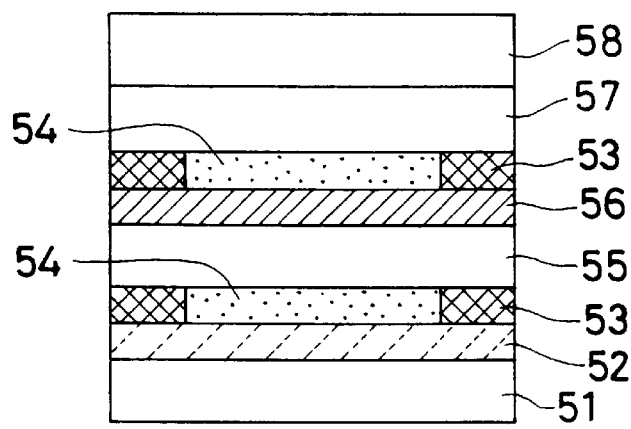

FIG. 13 shows an embodiment in which spacers are disposed on the respective sides of the photosensitive material and the original plate. In this embodiment, the spacer 53 is disposed on the photosensitive material 52 supported by the substrate 51, and the space defined by the spacer 53 is filled with the optical contacting liquid 54. Further, the substrate 55 and the original plate 56 are successively stacked thereon, and the spacer 53 is disposed on the original plate 56. Then, the space defined by the spacer 53 is filled with the optical contacting liquid 54 in the same way as the above. Further, the ND glass 57 and the anti-reflection substrate 58 are successively stacked thereon, and the resulting structure is pressed from above it, thereby allowing the thickness of the optical contacting liquid 54 between the photosensitive material 52 and the substrate 55 to be maintained at a predetermined level by the spacer 53 and also permitting the thickness of the optical contacting liquid 54 between the original plate 56 and the ND glass 57 to be maintained at a predetermined level by the spacer 53. By applying reconstruction light to the stack structure in this state, a hologram image of the original plate 56 can be duplicated in the photosensitive material 52.

Next, duplication of a reflection hologram will be explained with reference to FIGS. 14 to 16.

The basic structure of the reflection hologram is the same as in the case of the transmission hologram except that the positional relationship between the original plate and the photosensitive material is inverted.

Figure 14:
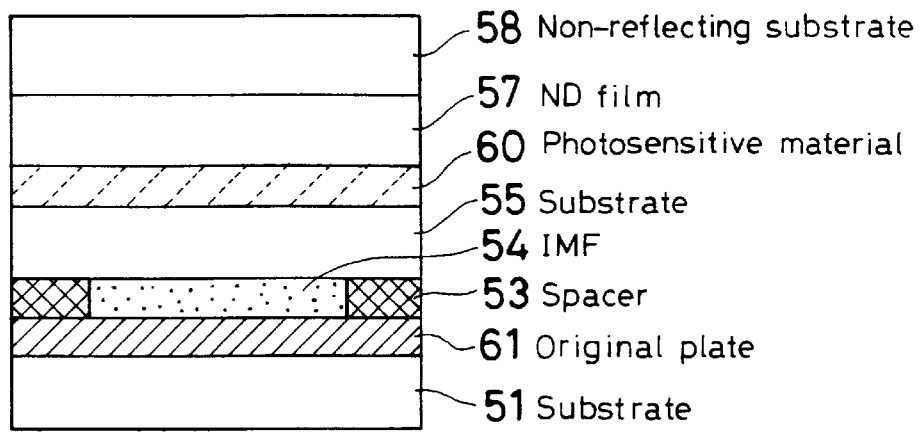
FIGS. 14 to 16 are views for explanation of a method of duplicating a reflection hologram.

In an embodiment shown in FIG. 14, a spacer 53 is disposed on a reflection hologram original plate 61 supported by a substrate 51, and the space defined by the spacer 53 is filled with an optical contacting liquid 54. On the spacer 53 and the optical contacting liquid 54 are successively stacked a photosensitive material 60 supported by a substrate 55, an ND glass 57, and a substrate 58 provided with an anti-reflection coating. Then, the resulting stack structure is pressed from above it. As a result, the thickness of the optical contacting liquid 54 between the original plate 61 and the substrate 55 becomes uniform. If reconstruction light is applied from the upper side in this state, the reconstruction light and the diffracted light from the original plate 61 interfere with each other in the photosensitive material 60. Thus, a hologram image is duplicated in the photosensitive material 60.

Figure 15:
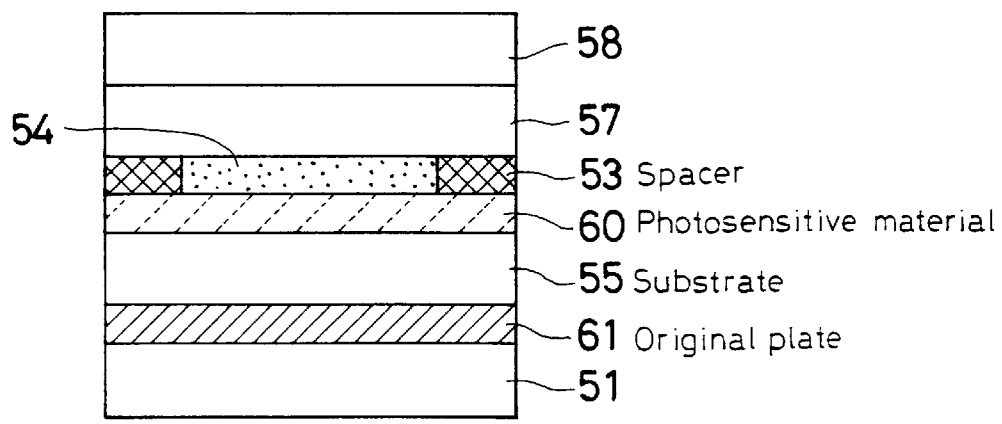

In an embodiment shown in FIG. 15, the original plate 61, which is supported by the substrate 51, and the photosensitive material 60 are placed opposite each other with the substrate 55 interposed therebetween in close contact with them. Then, the spacer 53 is disposed on the photosensitive material 60, and the space defined by the spacer 53 is filled with the optical contacting liquid 54. Further, the ND glass 57 and the anti-reflection substrate 58 are successively stacked thereon. Then, the resulting stack structure is pressed from above it, thereby bringing the ND glass 57 into close contact with the photosensitive material 60. Thus, the thickness of the optical contacting liquid 54 between the photosensitive material 60 and the ND glass 57 becomes uniform, and the photosensitive material 60 and the ND glass 57 come in close contact with each other. If reconstruction light is applied from the upper side in this state, the reconstruction light and the diffracted light from the original plate 61 interfere with each other in the photosensitive material 60. Thus, a hologram image is duplicated in the photosensitive material 60.

Figure 16:
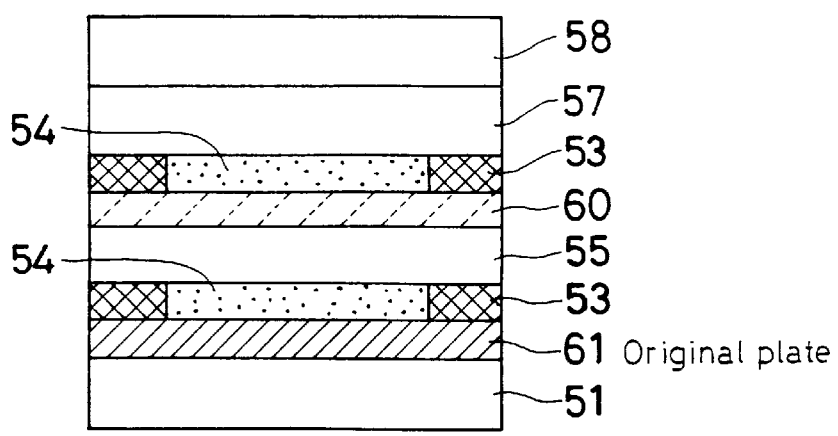

In an embodiment shown in FIG. 16, a spacer is interposed between the original plate and the photosensitive material, and another spacer is disposed on the photosensitive material. The spacer 53 is disposed on the original plate 61 supported by the substrate 51, and the space defined by the spacer 53 is filled with the optical contacting liquid 54, and the photosensitive material 60, which is supported by the substrate 55, is brought into close contact with the spacer 53 and the optical contacting liquid 54. Further, the spacer 53 is disposed on the photosensitive material 60, and the space defined by the spacer 53 is filled with the optical contacting liquid 54. Further, the ND glass 57 and the anti-reflection substrate 58 are successively stacked thereon. Then, the resulting stack structure is pressed from above it, thereby bringing the substrate 55 into close contact with the original plate 61 and also bringing the ND glass 57 into close contact with the photosensitive material 60. Thus, the thickness of each optical contacting liquid is maintained at a predetermined level. By applying reconstruction light from the upper side in this state, a hologram image of the original plate 61 is duplicated in the photosensitive material 60.

Thus, when contact duplication of a hologram is to be carried out, a spacer is provided, and the space defined by the spacer is filled with an optical contacting liquid. By pressing a layer which is to be brought into close contact with another in this state, the thickness of the optical contacting liquid can be made uniform within a short period of time and maintained in this state. Accordingly, undesirable flow of the optical contacting liquid can be eliminated, and a hologram image of good quality can be efficiently duplicated. Thus, the productivity can be increased.

What we claim is:

1. A hologram producing method in which an image of an original plate hologram is recorded on a duplicating photosensitive material film by applying laser light to a duplicating system in which an original plate unit, which includes said original plate hologram supported by a substrate and an original plate protecting glass bonded to an upper side of said original plate hologram, is brought into close contact with a duplicating unit which includes said duplicating photosensitive material film placed in close contact with a glass selected from the group consisting of an anti-reflection coated glass, an ND glass, and an anti-reflection coated ND glass through an optical contacting liquid, said method further comprising adding a surface active agent to said optical contacting liquid so as to increase wettability of said optical contacting liquid with respect to the base material, thereby reducing the incidence of defects caused by air trapped during duplication.

2. A hologram producing method in which an image of an original plate hologram is recorded on a duplicating photosensitive material film by applying laser light to a duplicating system in which an original plate unit, which includes said original plate hologram supported by a substrate and an original plate protecting glass bonded to an upper side of said original plate hologram, is brought into close contact with a duplicating unit which includes said duplicating photosensitive material film placed in close contact with a glass selected from the group consisting of an anti-reflection coated glass, an ND glass, and an anti-reflection coated ND glass through an optical contacting liquid, wherein said optical contacting liquid is a liquid substance comprising an ionizing radiation curing material so that said optical contacting liquid is polymerized through a curing reaction caused by irradiation with ionizing radiation after initiating the duplication process, thereby making it separable from said film.

3. A hologram producing method comprising bringing a hologram original plate and a duplicating photosensitive material into close contact with each other through at least a spacer and an optical contacting liquid injected into a space defined by said spacer, and carrying out laser exposure so that diffracted light from said hologram original plate and incident light interfere with each other in said duplicating photosensitive material, thereby recording a hologram image in said duplicating photosensitive material, wherein said spacer comprises glass or plastic beads with a refractive index corresponding to that of the optical contacting liquid, said beads being interspersed within the optical contacting liquid so as to dot the surface of one of either said hologram original plate or said duplicating photosensitive material.

4. The method of claim 3 in which carrying out laser exposure includes exposing the hologram original plate and duplicating photosensitive material to laser light from the side closest to the duplicating photosensitive material.

5. A hologram producing method comprising the steps of: bringing a hologram original plate and a duplicating photosensitive material into close contact with each other;

placing a glass selected from the group consisting of an anti-reflection coated glass, an ND glass, and an anti-reflection coated ND glass on one of either said hologram original plate or said duplicating photosensitive material in close contact with each other through a spacer and an optical contacting liquid injected into a space defined by said spacer; and applying laser light for exposure from said glass side so that diffracted light from said hologram original plate and incident light interfere with each other in said duplicating photosensitive material, thereby recording a hologram image in said duplicating photosensitive material, wherein said spacer is provided with members comprising glass or plastic beads with a refractive index corresponding to that of the optical contacting liquid, said members being interspersed within the optical contacting liquid so as to dot the surface of one of either said hologram original plate or said duplicating photosensitive material.

6. A hologram producing method according to claim 5, further comprising a step of providing a transparent member interposed between said hologram original plate and said duplicating photosensitive material.

7. The method of claim 5 in which applying laser light includes applying laser light to the hologram original plate and duplicating photosensitive material from the side closest to the duplicating photosensitive material.

8. A hologram producing method comprising the steps of: bringing a hologram original plate and a duplicating photosensitive material into close contact with each other through at least a spacer and an optical contacting liquid injected into a space defined by said spacer; placing a glass selected from the group consisting of an anti-reflection coated glass, an ND glass, and an anti-reflection coated ND glass on one of either said hologram original plate or said duplicating photosensitive material in close contact with each other through a spacer and an optical contacting liquid injected into a space defined by said spacer; and applying laser light for exposure from said glass side so that diffracted light from said hologram original plate and incident light interfere with each other in said duplicating photosensitive material, thereby recording a hologram image in said duplicating photosensitive material, wherein said spacer is provided with members comprising glass or plastic beads with a refractive index corresponding to that of the optical contacting liquid, said members being interspersed within the optical contacting liquid so as to dot the surface of one of either said hologram original plate or said duplicating photosensitive material.

9. The method of claim 8 in which applying laser light includes applying laser light to the hologram original plate and duplicating photosensitive material from the side closest to the duplicating photosensitive material.

10. A hologram producing method in which an image of an original plate hologram is recorded on a duplicating photosensitive material film by applying laser light to a duplicating system in which an original plate unit, which includes said original plate hologram supported by a substrate, is brought into close contact with a duplicating unit which includes said duplicating photosensitive material film placed in close contact with a glass selected from the group consisting of an anti-reflection coated glass, an ND glass, and an anti-reflection coated ND glass through an optical contacting liquid, wherein the thickness of said glass is set in the range of 0.1 mm to 1.5 mm so that said glass is flexible, and in which said duplicating photosensitive material film is positioned between said glass and said original plate hologram.

11. The method of claim 10 in which optical contacting liquid layers are positioned on both sides of said duplicating photosensitive material, said glass being sufficiently flexible to produce optical contacting liquid layers sufficiently thin to prevent fluid flow that could degrade said image.

12. A hologram producing method in which an image of an original plate hologram is recorded on a duplicating photosensitive material film by applying laser light to a duplicating system in which an original plate unit, which includes said original plate hologram supported by a substrate, is brought into close contact with a duplicating unit which includes said duplicating photosensitive material film placed in close contact with a polymeric material sheet through an optical contacting liquid, wherein said sheet is flexible and equal to said optical contacting liquid in refractive index, and in which said duplicating photosensitive material is positioned between said polymeric sheet material and said original plate.

13. The method of claim 12 in which optical contacting liquid layers are positioned on both sides of said duplicating photosensitive material, said polymeric sheet material being sufficiently flexible to produce layer thicknesses sufficiently thin to prevent fluid flow that could degrade said image.

* * * * *